United States Patent [19]
Bourne

[11] Patent Number: 4,787,035
[45] Date of Patent: Nov. 22, 1988

[54] META-INTERPRETER

[75] Inventor: David A. Bourne, Pittsburgh, Pa.

[73] Assignee: Westinghouse Electric Corp., Pittsburgh, Pa.

[21] Appl. No.: 788,650

[22] Filed: Oct. 17, 1985

[51] Int. Cl.$^4$ .............................................. G06F 9/00
[52] U.S. Cl. ..................................................... 364/300
[58] Field of Search ........................................ 364/300

[56] References Cited
PUBLICATIONS

Foster, D. M., "A Simple List-Processing Interpreter," The Computer Journal, vol. 6, Issue 2, Jul. 1965, pp. 120–129, L 7140 1358.
Bourne et al., "Autonomous Manufacturing: Automating the Job-Shop, IEEE, Sep., 1984, pp. 76–86.
Bourne et al., "Designing Programming Languages for Manufacturing Cells," Robotics Institute, Carnegie Mellon University, Apr., 1982, pp. 1–18.
Bourne, "Artificial Intelligence in Flexible Manufacturing", Robotics Institute, Carnegie Mellon University, pp. 66–76.
Fussell et al, "A Design of A Controller as a Component of a Robotic Manufacturing System," Robotics Inst., Carnegie Mellon Univ., Journal of Manufacturing Systems, vol. 3, No. 1, pp. 1–11.
Bourne, "A Numberless Tensed Language for Action Oriented Tasks", The Robotics Institute, Carnegie Mellon University, Oct., 1982, pp. 1–19.
Bourne et al, "Designing Programming Languages for Manufacturing Cells, The Robotics Institute, Carnegie-Mellon University, Apr. 1982, pp. 1–17.

Primary Examiner—Raulfe B. Zache
Attorney, Agent, or Firm—G. E. Hawranko

[57] ABSTRACT

The present invention includes an interpreter in which a parser examines a message using grammar and lexical tables to produce a parse table. The parse table is compared to data needed in a semantics table to fire a rule. The firing of a rule causes a function table to be evaluated. The function table includes function calls which can perform user desired functions. Among the functions is a generate function which will take the contents of a table and turn it into a message and route the message to a destination where the destination can be a table, process or device. Plural interpreters can be created where each interpreter includes a workspace containing the above-mentioned tables. Each interpreter can perform a different task such as recognizing the meaning of a message in one language and performing some action such as sending out a message in a different language or updating a database. The present invention is particularly suitable for managing a machining workcell including machines from different vendors.

19 Claims, 24 Drawing Sheets

Microfiche Appendix Included
(5 Microfiche, 245 Pages)

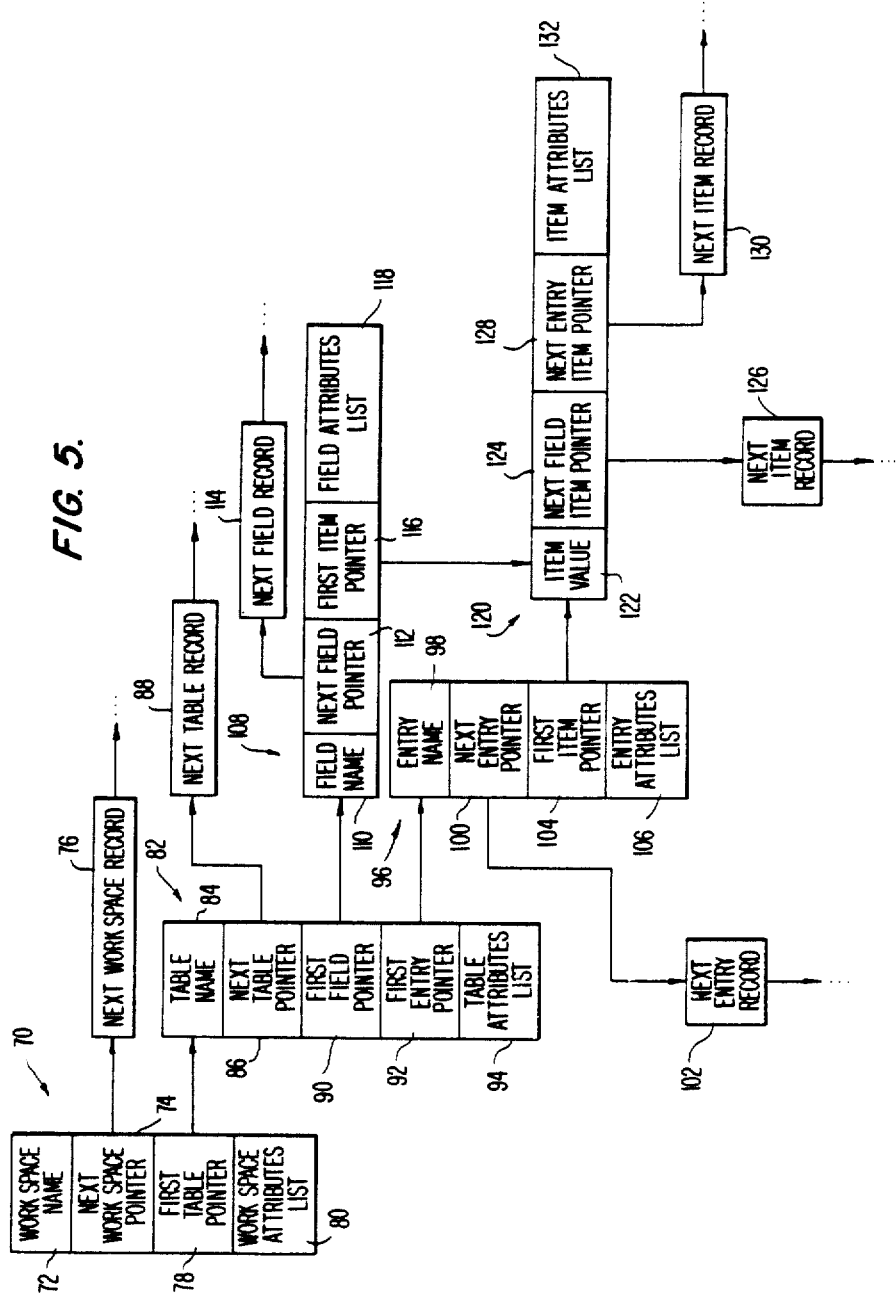

*FIG. 6.*

```
                DATA DEFINITIONS

WORKSPACE=      RECORD
                WORKSPACE_NAME      STRING;
                NEXT_WORKSPACE:     POINTER;
                FIRST_TABLE:        POINTER;
                ATTRIBUTES:         WS_ATTRIBUTES;
                END;

TABLE=          RECORD
                TABLE_NAME:         STRING;
                NEXT_TABLE:         POINTER;
                FIRST_ENTRY:        POINTER;
                FIRST_FIELD:        POINTER;
                ATTRIBUTES:         T_ATTRIBUTES;
                END;

ENTRY=          RECORD
                ENTRY_NAME:         STRING;
                NEXT_ENTRY:         POINTER;
                FIRST_ITEM:         POINTER;
                ATTRIBUTES:         E_ATTRIBUTES;
                END;

FIELD=          RECORD
                FIELD_NAME:         STRING;
                NEXT_FIELD:         POINTER;
                FIRST_ITEM:         POINTER;
                ATTRIBUTES:         F_ATTRIBUTES;
                END;

ITEM=           RECORD
                ITEM_VALUE:         STRING;
                NEXT_ENTRY_ITEM:    POINTER;
                NEXT_FIELD_ITEM:    POINTER
                ATTRIBUTES:         I_ATTRIBUTES;
                END;
```

FIG. 8.

| SENTENCES | FIELD 1 | FIELD 2 | FIELD 3 | FIELD 4 |
|---|---|---|---|---|
| TOP | SENTENCES:COMMAND/T/0 | SENTENCES:DECLARE/T/0 | (OTHER TYPES OF SENTENCES) | STRINGS/0 |
| COMMAND | VERB/R | ARTICLE/1/0 | NOUN/1/R | SENTENCES:PREP. PHRASE |
| DECLARE | ARTICLE/1/R | SENTENCES:NOUNPHRASE/0 | VERB/R | OBJECT/R |
| NOUN PHRASE | SENTENCES:ADJECTIVE LIST/T/0 | NOUN/R | | |
| ADJECTIVE LIST | ADJECTIVE/0 | SENTENCES:ADJECTIVE LIST/T/0 | | |
| PREP. PHRASE | PREPOSITION/1/R | ARTICLE/2/0 | NOUN/2/0 | |

134

FIG. 9.  FIG. 10.  FIG. 11.  FIG. 12.
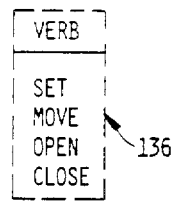
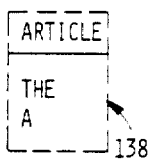
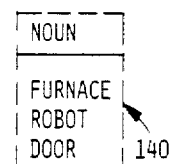
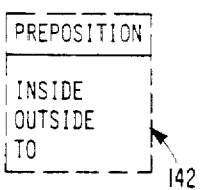
FIG. 15.
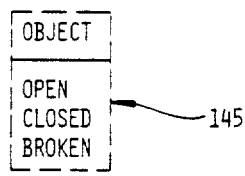
FIG. 13.  FIG. 14.
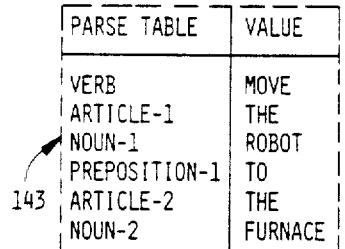
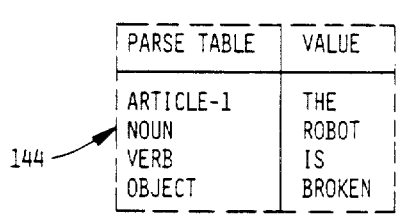
FIG. 16.
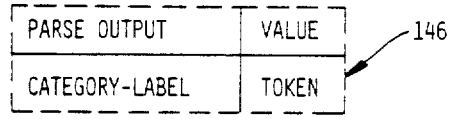
FIG. 17.
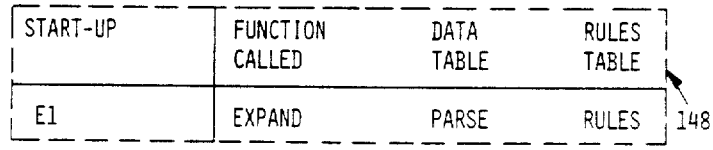

FIG. 18.

| PARSE TABLE | VALUE |
|---|---|
| VERB | SET |
| ARTICLE-1 | THE |
| NOUN-1 | FURNACE |
| NOUN-2 | TEMPERATURE |
| PREPOSITION | TO |
| DECIMAL | 2260 |

| SUBSTITUTION TABLE | VALUE |
|---|---|
| VERB | SET |
| NOUN-1 | ROBOT |
| NOUN-2 | FURNACE |
| DECIMAL | 2260 |

| RULES | CALL | FUNCTION/TABLE TO BE EVALUATED | ARGUMENT1 | VALUE1 | ARGUMENT2 | VALUE2 | ARGUMENT3 | VALUE3 | ARGUMENT4 | VALUE4 |
|---|---|---|---|---|---|---|---|---|---|---|
| R1 | EVALUATE | FURNACE UPDATE | VERB | =SET | NOUN-1 | X | NOUN-2 | Y | DECIMAL | Z |
| R2 | EVALUATE | MOVE | VERB | =MOVE | ADJ-1 | X | NOUN-1 | Y | NOUN-2 | Z |

| MOVE | FUNCTION | ARGUMENT 1 | ARGUMENT 2 | ARGUMENT 3 |
|------|----------|------------|------------|------------|
|      | UPDATE   | DATABASE:NOUN-1 | SUBSTITUTION TABLE:NOUN-2 | --- |
|      | UPDATE   | ROBOT LANGUAGE:MOVE ROBOT | POSITIONS:FURNACE | --- |
|      | GENERATE | ROBOT LANGUAGE:MOVE ROBOT | PROCESS | ROBOT |

| ROBOT LANGUAGE | ROBOT COMMAND | X-POSITION | Y-POSITION | Z-POSITION |
|----------------|---------------|------------|------------|------------|
| POSITION GRIPPER | M05 | 10 | 20 | 30 |
| MOVE ROBOT | M03 | 18 | 05 | 65 |

| POSITIONS | X-POSITION | Y-POSITION | Z-POSITION |
|---|---|---|---|
| FURNACE | 15 | 05 | --- |
| GRIPPER | 185 | 13 | 28 |
| ROBOT | 18 | 05 | 65 |

| ROBOT LANGUAGE | ROBOT COMMAND | X-POSITION | Y-POSITION | Z-POSITION |
|---|---|---|---|---|
| POSITION GRIPPER | M05 | 10 | 20 | 30 |
| MOVE ROBOT | M03 | 15 | 05 | 65 |

| EMPLOYEES TABLE | EMPLOYEES | JOB | SALARY | AGE |
|---|---|---|---|---|
| E1 | BILL | PLUMBER | 15,000 | 25 |
| E2 | JUNE | MANAGER | 30,000 | 32 |

| MASTER TABLE | JOB | SALARY | SENIORITY |
|---|---|---|---|
| BOB | MECHANIC | 17,000 | 5 YEARS |
| BILL | * * * | * * * | 0 YEARS |
| JANE | * * * | * * * | 3 YEARS |
| SUE | SECRETARY | 12,000 | 1 YEARS |

| MOVE BILLET TO FURNACE | FUNCTION | ARGUMENT 1 | ARGUMENT 2 | ARGUMENT 3 |
|---|---|---|---|---|
| E1 | GENERATE | MOVE BILLET, | PROCESS | ROBOT |

| MOVE BILLET | ROBOT COMMAND | X-POSITION | Y-POSITION | Z-POSITION | SEPARATOR |
|---|---|---|---|---|---|
| POSITION GRIPPER | M05 | 10 | 20 | 30 | # |
| CLOSE GRIPPER | M01 | -- | -- | -- | # |
| LIFT BILLET | M05 | 10 | 30 | 50 | # |
| MOVE TO FURNACE | M03 | 15 | 05 | 35 | # |
| LOWER BILLET | M05 | 05 | 15 | 25 | # |
| OPEN GRIPPER | M02 | -- | -- | -- | # |
| MOVE FROM FURNACE | M03 | 10 | 20 | 25 | # |

| FURNACE DOOR | FIELD |
|---|---|
| POSITION | 60 |
| OPEN | 50 |
| CLOSED | 70 |

| LANGUAGE | PARSER GRAMMAR TABLE | TABLE TO BE EVALUATED | WORKSPACE |
|---|---|---|---|
| ROBOT | VAL | INTERPRET | ROBOT-1 |
| VISION | RAIL | INTERPRET | VISION-1 |
| FURNACE | LADDER | INTERPRET | FURNACE-1 |
| CELL-SPECIALIST | SPECIALIST | INTERPRET | SPECIALIST-1 |

| TABLE A | F1 | F2 | F3 |
|---|---|---|---|
| W | JAN | FEB | MAR |
| X | APR | MAY | JUN |
| Y | JUL | AUG | SEP |
| Z | OCT | NOV | DEC |

| TABLE B | A | F2 | C |
|---|---|---|---|
| Q | MON | FEB | 2 |
| Y | THU | MAY | 6 |
| Z | SAT | OCT | 23 |

| BEGIN TABLE | FIELD 1 | CLAUSE | ARGUMENT 1 | ARGUMENT 2 |
|---|---|---|---|---|
| E1 | BEGIN CONDITION | FURNACE DOOR: POSITION ≠ FURNACE DOOR:OPEN | --- | --- |
| E2 | GENERATE | FURNACE LANGUAGE:OPEN FURNACE, | PROCESS, | FURNACE |
| E3 | END | --- | --- | --- |
| E4 | GENERATE | ROBOT LANGUAGE:MOVE ROBOT, | PROCESS, | ROBOT |

| TABLE C | F1 | F2 |
|---|---|---|
| W | JAN | MAR |
| X | APR | JUN |

| LANGUAGE | PARSER GRAMMAR TABLE FOR SYSTEM MESSAGES | TABLE EVALUATED FOR SYSTEM MESSAGES | OUTPUT TABLE FOR SYSTEM MESSAGES | WORKSPACE USED | DEVICE PROCESS GRAMMAR TABLE | DEVICE PROCESS EVALUATION TABLE | OUTPUT TABLE FOR DEVICE PROCESS MESSAGES |
|---|---|---|---|---|---|---|---|
| ROBOT | VAL | INTERPRET-1 | PARSE-1 | ROBOT-1 | ROBOTMSG | MOVE ROBOT | PARSE-2 |
| VISION | RAIL | INTERPRET-2 | PARSE-1 | VISION-1 | VISIONMSG | FIND ROBOT | PARSE-2 |
| FURNACE | LADDER | INTERPRET-3 | PARSE-1 | FURNACE-1 | FURNACEMSG | FURNACE | PARSE-2 |
| CELL-SPECIALIST | SPECIALIST | INTERPRET-2 | SYSTEM-1 | SPECIALIST-1 | SYSTEM | STATUS | SYSTEM-1 |

| ROBOT STATUS | SURFACE TEMP. | POSITION | OIL PRESSURE | OIL TEMP. |
|---|---|---|---|---|
| COLD ROBOT | 23C | AT CHUCK B | 36 | 23C |
| HOT ROBOT | 256C | AT FURNACE DOOR | 63 | 184C |
| GFM | 140 | IN FORGE | 57 | 26C |

| HOT ROBOT TEMP. | SURFACE TEMP. | OIL TEMP. |
|---|---|---|
| HOT ROBOT | 256C | 184C |

| FILTER | VALUE |
|---|---|
| NOUN | X (VARIABLE) |
| ARTICLE | X (VARIABLE) |

| RESULT | VALUE |
|---|---|
| NOUN + / ARTICLE NOUN 2 | IBM PC THE ROBOT |

| SOURCE | VALUE |
|---|---|
| ADJECTIVE | DAVID'S |
| NOUN-1 | IBM PC |
| VERB | SPOKE |
| PREPOSITION | WITH |
| ARTICLE | THE |
| NOUN-2 | ROBOT |

| PARSE TABLE | VALUE |
|---|---|
| ARTICLE-1 | THE |
| NOUN-1 | ROBOT |
| VERB | DROPPED |
| ARTICLE-2 | THE |
| NOUN-2 | BILLET |

| TABLE C | F2 |
|---|---|
| X | AUG |
| Z | NOV |

| G1 | FIELD 1 | FIELD 2 |
|---|---|---|
| SENTENCE | | |
| SUBJECT | G1:SUBJECT/T/A6=R/A3=B | G1:PREDICATE/T/A6=R |
| | ARTICLE/A2=-1/A6=0 | NOUN/A2=-1/A6=R |
| PREDICATE | VERB/A6=R | G1:OBJECT/T/R |
| OBJECT | ARTICLE/A2=-1/A6=0 | NOUN/A2=-1/A6=R |

| CELL STATES | VALUE |
|---|---|
| ROBOT | LOADED PART |
| FURNACE | DOOR OPEN |
| TOOL | STOPPED |
| VISION | FOUND PART |

FIG. 46.

| RULES | EVALUATE | FUNCTION | TYPE | IF VALUE | TYPE | IF VALUE |
|---|---|---|---|---|---|---|
| R1 | EVALUATE | ACTION 1 | FURNACE | = DOOR OPEN | ROBOT | = LOADED PART |
| R2 | EVALUATE | ACTION 2 | ROBOT | = LOADED PART | FURNACE | = DOOR CLOSED |

FIG. 49.

| ORDER | CUSTOMER | QUANTITY | DUE DATE | STYLE |
|-------|----------|----------|----------|-------|
| 1 | IBM | 200 | 09/23/85 | X |
| 2 | GE | 100 | 10/01/85 | Y |
| 3 | W | 1000 | 11/10/85 | Z |

| TOOLS | QUANTITY | TYPE | LOCATION | PART STYLE |
|-------|----------|------|----------|------------|
| 1 | 10 | END-MILL | BLDG. A | X |
| 2 | 0 | DRILL | BLDG. B | Y |
| 3 | 5 | TAP | BLDG. C | Z |

| PARSE | VALUE |
|-------|-------|
| TOOL - ORDERS DATE | ALL BEFORE |

288

META-INTERPRETER

This patent contains a microfiche appendix containing 5 microfiche and 245 frames.

TABLE OF CONTENTS

I. Background of the Invention
  A. Field of the Invention
  B. Description of the Related Art
II. Summary of the Invention
III. Brief Description of the Drawings
IV. Description of the Preferred Embodiments
  A. Introduction
  B. The Data Structure
  C. Addressing
  D. Parsing
  E. Semantic Attachment
  F. Function Evaluation
  G. The Table Update Function
  H. The Message Generation Function
  I. The Process Connect Function
  J. The Make Table Function
  K. The Cut and Paste Functions
  L. The Conditional Execution Functions
  M. The Run Function
  N. Attributes
  O. Workspace Management
  P. Language Enhancements
V. Applications
  A. Workcell Control
  B. Virtual Database
  C. International Interface to Software Tools
  D. Other Applications and Embodiments
VI. The Claims

I. BACKGROUND OF THE INVENTION

A. Field of the Invention

The present invention is a set of computational tools that facilitate the integration of multifunction computer systems and multiple computer languages. The present invention significantly decreases the programming efforts necessary to integrate conventionally incompatible systems. The invention is a meta-interpreter that makes it possible to automatically produce and understand programs and command messages. The present invention also allows the user to manipulate non-compatible programming languages. Once interpreters for different machines and human languages have been constructed, they can be linked together into a system of interpreters. This complex system can be used to make intelligent decisions for system wide actions, planning and diagnostic recovery by parsing meaning from incoming messages, maintaining a global model of the states of the system and finally producing outgoing messages in the appropriate language to control the system.

More specifically, the present invention is directed to an interpreter capable of analyzing a message in any language, whether it is an artificial language or a natural human language, and produce some action based on the interpreted message. The action can be as simple as updating a table or as complex as translating the message into another language either natural or artificial. The interpreter also has the capability of making decisions based on multiple messages and implementing those decisions in the form of some action or producing a program to run a robot. The data structure of the invention allows the representation of all user programs and data in a table format which allows programs to be the object of traditional database operations.

B. Description of the Related Art

The expectations triggered by advanced robotic systems peaked with visions of increased productivity and quality. Much to everyone's disappointment, these expectations have still not been realized. It has turned out that advanced stand-alone machines were not enough to increase productivity, and integrating large systems has been prohibitively expensive. What is worse, the few projects that were undertaken took inordinate amounts of engineering time: 50 man years has not been the worst case. Most of this time has been spent by engineers trying to put round plugs into square sockets because some machines were not designed to allow any communication, while in others the feedback system did not allow for consistent results, and all were programmed using different languages or modifications of the same language that created incompatibility problems.

One attempt at solving the communication problem has been a multi-vendor initiative to standardize the communication protocols between computational components in the manufacturing environment called Manufacturing Automation Protocol (MAP). This is an effort to standardize the interconnection of equipment from the communication medium all the way up to a complex message passing scheme that would allow for file transfers and other application dependent tasks within a multi-vendor network. The MAP effort offers a standardized approach for transferring messages within a network of machines but does not provide any intelligent understanding of these messages.

An interpreter is one way of understanding messages. Computer language interpreters convert a message in the computer language into a form which can then be executed by the machine, however, such interpreters are specifically geared to the target machine and the source language.

FIG. 1A illustrates a prior art procedural approach to interpreting messages in computer languages such as Fortran and Basic. First, the message is divided into tokens based on a syntax, the tokens are compared to a dictionary containing the legal words of the system and then the tokens are output by the lexical analysis stage 2 to a parsing stage 4. The parsing stage 4 produces a parse tree which analyzes the message in terms of the system's grammar. An example of a parse tree 6 for the equation $a=(b+c)*d$ is illustrated in FIG. 1B. The parse tree is then used by a semantic checking stage 8 which attaches meaning to the message. The next stage can be one of two types depending on the language being implemented. The message can be applied to a compiler 10 which produces executable code in the target machine language or the message can be applied to an interpreter 12 which essentially executes a subroutine call that immediately carries out the desired action, such as occurs in Basic.

Prior Art procedural languages and interpreters are designed for a single processor with a single memory resulting in a bottleneck impeding the flow of instructions because each instruction is expected to go through the processor in turn. Interpreters, for example, a Basic interpreter, deduce the state of the system from the content of previous messages, such that new messages can act on information provided by previous messages.

Basic can only maintain status and build action plans by modifying data.

In contrast, a non-procedural language describes an algorithm in such a way as to make the order of program statements unimportant. A non-procedural interpreter should be able to direct flow of high level instructions as they are needed. A non-procedural interpreter, if supplied with artificial intelligence features, should be able to modify not only status and data but the programs themselves. An intelligent non-procedural interpreter, if given multiple language understanding capability, should be able to understand and generate programs and messages in any language desired.

SUMMARY OF THE INVENTION

An object of the present invention is to provide an interpreter with artificial intelligence capabilities.

A further object of the present invention is to provide a meta-interpreter capable of receiving a message, analyzing the message for meaning using an application dependent grammar and rules. Finally, the present invention performs an action based on the meaning.

An additional object is to provide an environment in which a number of intelligent interpreters can freely interact. For example, the environment can be used to build a machining workcell management system for automated machines from different vendors.

Another object of the present invention is to provide an interpreter with program and data generation capability where the programs and data are represented in a tabular data structure suitable for manipulation using ordinary database processing techniques.

A further object of the present invention is to provide a meta-interpreter which is capable of building and using computer languages within the meta-interpreter.

Another object of the present invention is to provide an interpreter which organizes and systematically manages computer languages, so that messages in one computer language can be translated into messages in another computer language.

The above-mentioned objects can be attained by the implementation of one or more interpreters as programs dedicated to a particular task or by using a command language executed by a general purpose program which executes the functions of an interpreter as specified in a command language program. Each interpreter operates within a workspace that includes both data and programs represented as tables. Each workspace or interpreter can communicate to other workspaces, other non-interpreter processes and exterior processes or machines in a message format suitable for the message receiver. The meaning of each received message can be determined and used to govern how the interpreter responds to the message. Each interpreter uses a general table driven parser that examines a message using grammar and lexical tables to produce a parse table. The parse table is compared to data needed in a semantics table to fire one or more conditional rules resulting in meaning being applied to the message. The firing of a rule causes a function table to be evaluated. The function table includes function calls which can perform user desired functions thereby performing some action based on the meaning of the message. Among the functions is included a Generate function which will take the contents of a table and turn it into a message and route the message to a destination where the destination can be a table, process or device. Another function is an Update function which will use the meaning of the message to update a database.

The system of workspaces/interpreters can be implemented in a single computer as one process or a single computer with multiple processes or can be resident in different computers, so that true parallel execution can occur.

These together with other objects and advantages which will be subsequently apparent, reside in the details of construction and operation as more fully hereinafter described and claimed, reference being had to the accompanying drawings forming a part hereof, wherein like numerals refer to like parts throughout.

III. BRIEF DESCRIPTION OF THE DRAWINGS

Figure 3:
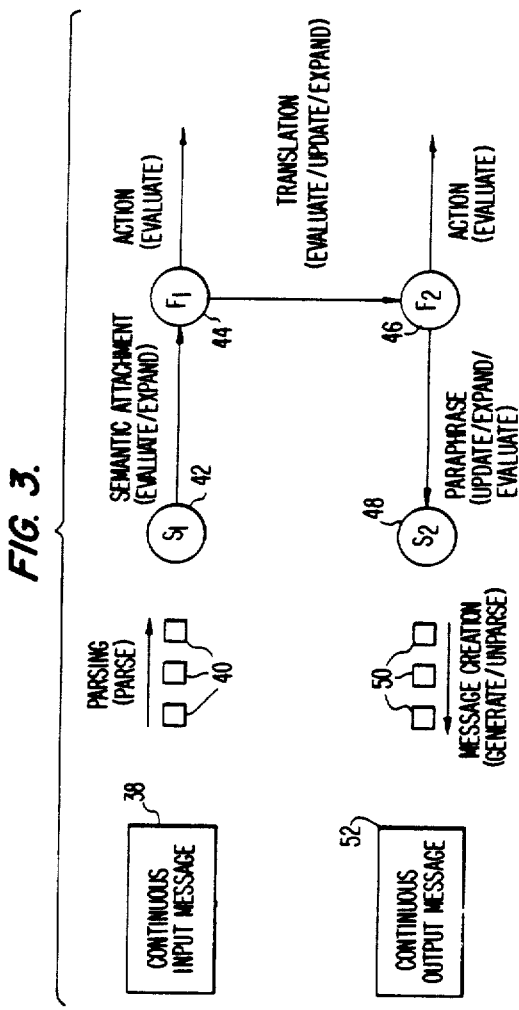
Figure 4:
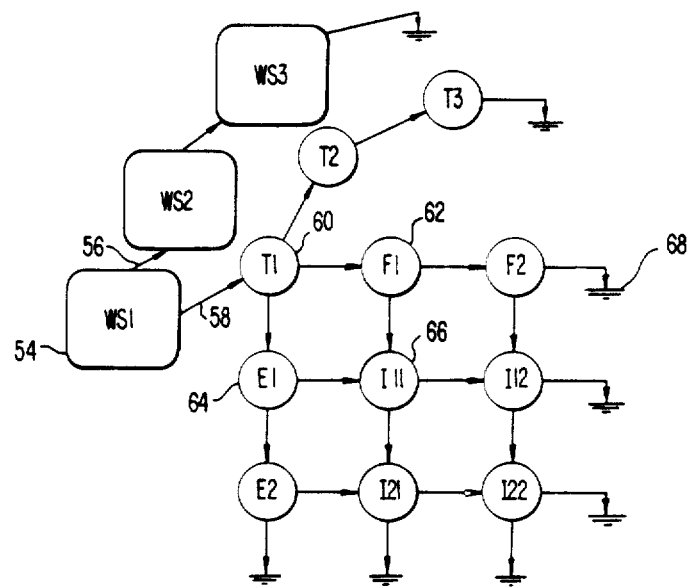
Figure 7:
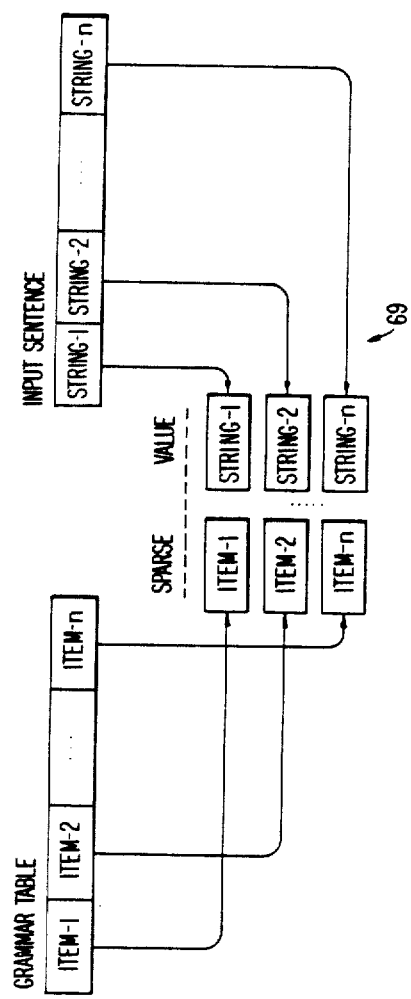
Figure 44:
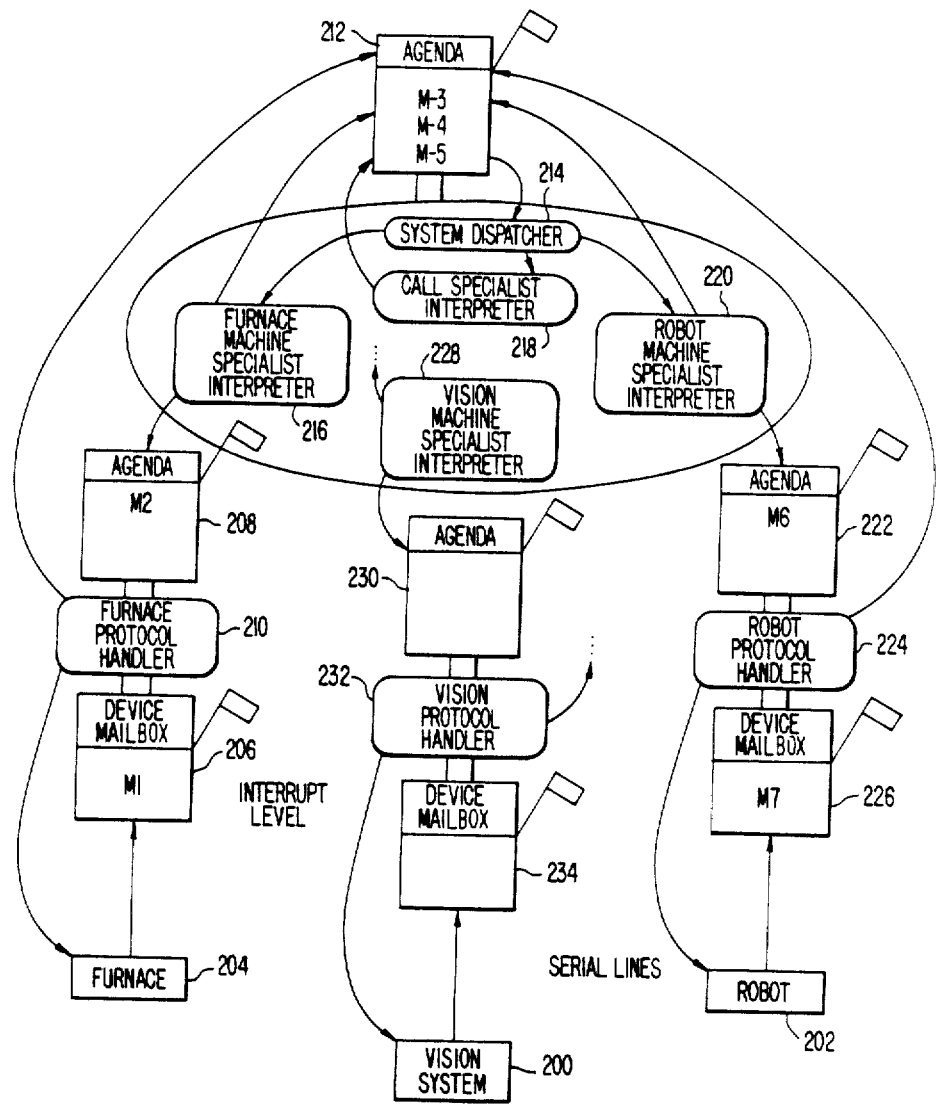
Figure 47:
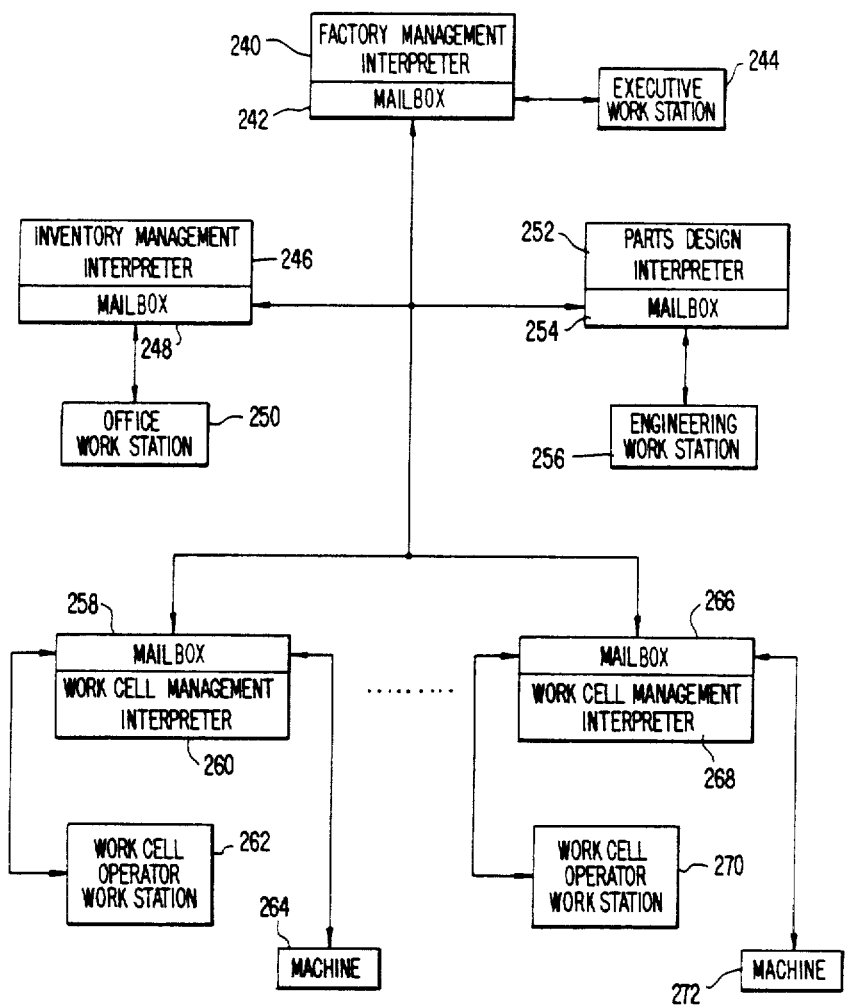
Figure 48:
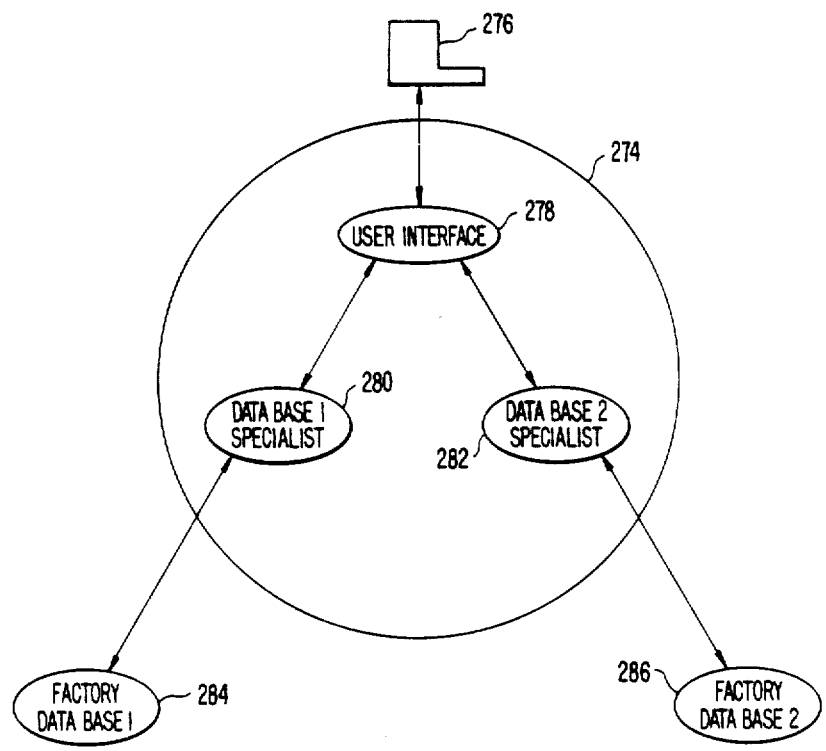

FIG. 3. illustrates the processes that can be performed by an interpreter of the present invention;

FIGS. 4-6 illustrate the data and record structure of the present invention;

FIG. 7 illustrates a parsing process;

FIG. 8 is an example of a grammar table used by the parser of the present invention;

FIGS. 9-12 and 15 are examples of lexical tables used by the parser of the present invention;

FIG. 13 is a parse table produced by the parser according to the present invention;

FIGS. 14 and 16 are examples of parse tables produced by the parser;

FIG. 17 is a status table;

FIG. 18 is a parse table;

FIG. 19 is an example of a rule or semantics table;

FIG. 20 is an example of a substitution table built by the present invention;

FIG. 21 is a function table evaluated by the present invention;

FIG. 22 is a robot language table for a hypothetical robot;

FIG. 23 is a device position table;

FIG. 24 is an updated robot language table;

FIG. 25-43 are examples of other tables used by the present invention;

FIG. 44 is an example of an application of the present invention to a workcell including an automated vision system, a robot and an automated furnace; and FIGS. 45 and 46 are examples of tables that can be used in the application of FIG. 44;

FIG. 47 is an example of interpreters residing in different machines;

FIG. 48 is an example of a virtual database;

FIGS. 49 and 50 are examples of databases accessed by the virtual database; and

FIG. 51 is a parse table created by the virtual database.

IV. DESCRIPTION OF THE PREFERRED EMBODIMENTS

A. Introduction

The present invention provides a table oriented environment for storing instructions and data, in contrast to to a LISP environment which represents everything as lists of lists. That is, both data and program instructions are treated as tables in the present invention. The two dimensional table structure provides access to each cell (item) within the structure, so that both programs and data can be transformed and generated using traditional database operations.

The present invention, because of its data structure and functions, simplifies the task of creating manufacturing systems by providing tools for automatic programming in a number of target languages. The present invention also facilitates the creation of rules for controlling multiple machine interactions. The tools as will be discussed in more detail hereinafter, include a parser driven by grammatical descriptions (syntax), rule primitives (semantics) and database manipulation primitives which are the most important primitives for defining, interpreting and generating text in different languages as well as for performing a desired action based on the interpretation. The present invention helps realize a significant reduction in the programming time necessary to create new factory automation systems.

Figure 1A:
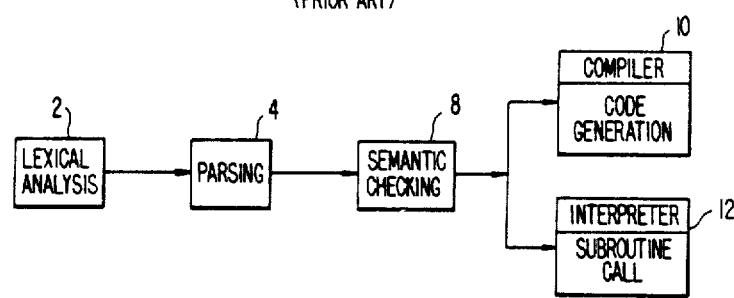
FIG. 1A is a diagram illustrating a prior art interpreter and compiler.
Figure 1B:
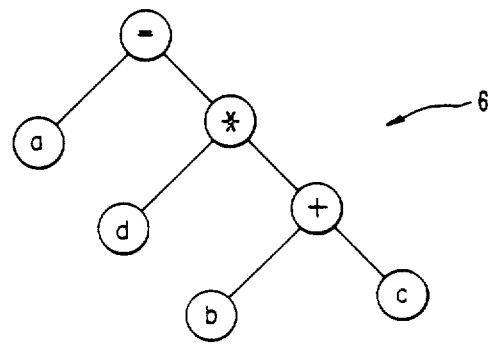
FIG. 1B is a diagram illustrating a prior art parse tree.
Figure 2A:
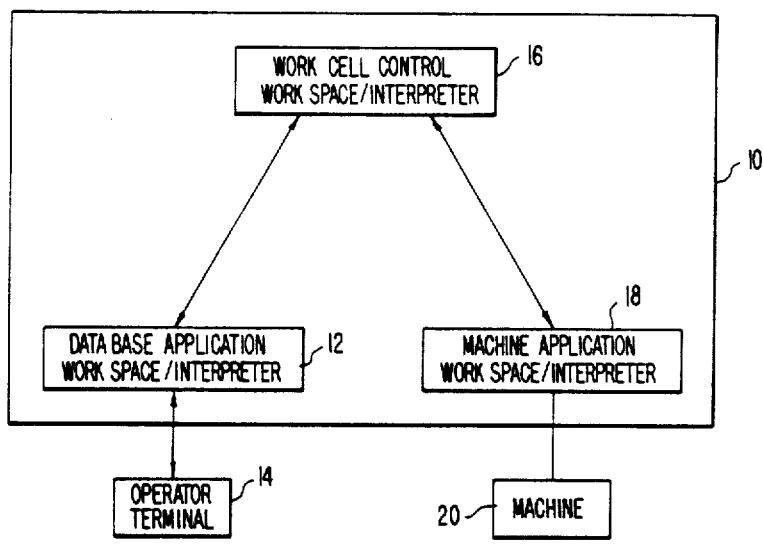
FIGS. 2A and 2B illustrate possible organizational relationships between interpreters according to the present invention.

It is important to clarify the boundaries between logically different interpreters. To accomplish this, workspaces provide a data structure that maintains the appropriate separation. FIG. 2A illustrates a hierarchical arrangement of workspaces which can perform useful tasks. In FIG. 2A, each of the workspaces resides in a single computer 10, however, it is possible for each workspace/interpreter to reside in a separate computer.

Figure 2B:
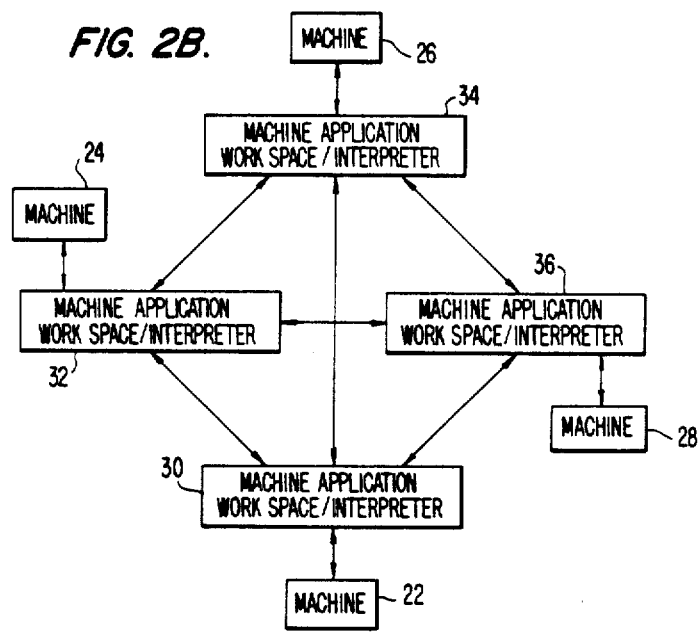

FIG. 2B illustrates a non-hierarchical workspace/interpreter arrangement in which machines 22-28 communicate to corresponding machine application workspace/interpreters 30-36. Each machine is communicating in a language suitable for the machine and the interpreters can communicate messages to each other as to the state of each machine and the tasks which need to be accomplished.

Each workspace/interpreter in either of the above-discussed arrangements is capable of taking a message A and converting it into a set of actions B. The message could be in the form of a human language type statement or a message from a robot that some action has been completed. The set of actions performed can be, among other things, updating a table, translating the message into another language, outputting a command or series of commands to a robot based on the message and making a decision based on an accumulation of messages.

FIG. 3 illustrates the functions provided by the interpreter of the present invention during a message interpretation and subsequent actions or translations. The names in parenthesis indicate functions of the interpreter to be discussed in detail herein which would commonly be executed at each stage of an interpretation; however, many other ancillary functions as well as combinations thereof can be executed at each stage as will also be discussed hereinafter.

A continuous input message 38 is broken down into its tokens 40, lexically analyzed and a parse table is created at step $S_1$ (42). Meaning is attached to the message by a semantic attachment stage. At this stage, the intelligence of the interpreter is brought to bear to determine how to evaluate the message at node $F_1$ (44) to produce an action or to initiate a translation once the meaning of the message is understood. The translation can convert the message into a message in a different language which can have a different meaning in the new language requiring another stage of semantic attachment and evaluation to produce an action in the new language. The creation of a message in the new language can also be started at node $F_2$ (46). Paraphrasing can be performed on the message in the new language to create an output table at node $S_2$ (48) from which the tokens 50 of the new message can be combined into a continuous output message 52 thereby generating a message 52 in the new language from one or more messages 38 in the old language.

The present invention is preferably implemented in a language capable of list processing such as Pascal, using a computer such as a Digital Equipment Corporation VAX 11/750 or the newer DEC Micro VAX II that can readily manage virtual memory. The reader unfamiliar with Pascal should review a text such as *Data Structures Using Pascal* by Tenenbaum and Augenstein, Prentice-Hall, 1981, which discusses and provides program examples using linked lists and which is incorporated by reference herein.

Throughout the following discussion pseudocode for the major functions of the interpreter of the present invention along with detailed discussions of the pseudocode are presented. Using the pseudocode as a guide and/or the discussions for implementation of details, one of ordinary skill in Pascal can provide the actual source code for the particular machine implementation of Pascal using the preferred data structure discussed herein. Other minor functions and subtasks are discussed in detail herein and the source code for the minor functions can also be provided by one of ordinary skill in Pascal.

B. The Data Structure

Because the present invention allows the representation of both data and program instructions in the same tabular structure, it is necessary to understand that structure before explaining the operation of the present invention.

The data structure of the present invention illustrated in FIGS. 4-6 is a compound or two dimensional linked list. The top of the list begins with a workspace 54 having a next workspace pointer 56 as illustrated in FIG. 4. Each workspace for example, WS1, includes a table pointer 58 pointing to a series of linked tables within the workspace. Each table 60 points to other tables (T2, T3) and also to fields 62 and entries 64 within the table 60. Both the field pointers and entry pointers point to items 66 within the table. Each item 66 includes the value of the item and a list of attributes which define the item. Each of the linked lists in FIG. 4 is terminated by a null pointer 68.

A more detailed example of a preferred data structure for the present invention is illustrated in FIG. 5. As can be seen from FIG. 5 each workspace record 70 includes a workspace name field 72, a next workspace pointer 74 pointing to the next workspace record 76, a first table pointer 78 pointing to the first table in the workspace and a list of workspace attributes 80. The workspace attributes define the workspace in a manner similar to the way the item attributes define the item.

Each table record 82 includes a table name field 84, a next table pointer 86 pointing to the next of the linked tables 88 in this workspace, a first table entry pointer 90 pointing to the first entry in the table and a first field pointer 92 pointing to the first field in the table. Each table record also includes a list of table attributes 94 which define the characteristics of the table.

Each entry record 96 includes an entry name field 98, a next entry pointer 100 pointing to the next entry record 102 in the table, a first item pointer 104 pointing to the first item in the entry, and a list of entry attributes 106 which define the characteristics of this entry.

Each field record 108 includes a field name 110, a next field pointer 112 pointing to the next field record 114 in the table, a first item pointer 116 pointing to the first item in the field and a field attributes list 118 which define the characteristics of this field.

Each item record 120 includes an item value 122, a pointer 124 pointing to the next item record 126 in the field direction of the table, a next entry item pointer 128 pointing to the next item record 130 in the entry direction and a item attributes list 132. The item record 120 includes a value field 122 instead of an item name; the value acts as the name.

The data structure of the present invention is a singly linked list, but, it could just as well be a doubly linked list structure where each record not only points to the next record but to the previous record. FIG. 6 illustrates the data definition for the data structure of the present invention as it would appear in the Pascal language. Additional information concerning the manipulation of linked list data structures not directed to a particular language implementation can be found in *The Art of Computer Programming, Fundamental Algorithms* by Knuth, Addison & Wesley, 1975, which is incorporated by reference herein.

C. Addressing

To address a particular record within the data structure of the present invention, an address called a pathname is used. A pathname is made up of a table name, an optional entry name and an optional field name. If a workspace is to be addressed, a workspace name followed by an optional table name is used in the preferred embodiment. The use of two pathname schemes, one for addressing within a workspace and one for operating across workspace boundaries, clearly separates workspace level commands and operations from interpreter level commands and operations. The structure of any final program is thus much clearer and easier to follow. It is, of course, possible to concatenate workspace, table, optional entry and optional field names to provide a general pathname scheme. The following pseudocode, which would preferably be implemented in Pascal, provides the mechanism for addressing a particular record in the data structure.

```
Start: = 1;
Final: = 1;
Skip_To_Character(Pathname,':',Start,Final,End_Of_String);
if Final > Start then
begin
   if End_Of_String then Pathname_Type: = 1;
   SubString(Pathname,Start,Final-1,Table_Path);
   Substitution(Table_Path,Table_Name);
   Start: = Final + 1;
end;
Skip_To_Character(Pathname,':',Start,Final,End_Of_String);
if Final > Start then
begin
   if End_Of-String then Pathname_Type: = 2;
   SubString(Pathname,Start,Final-1,Entry_Path);
   Substitution(Entry_Path,Entry_Name);
   Start: = Final + 1;
end;
Skip_To_Character(Pathname,':',Start,Final,End_Of-String);
if Final > Start then
begin
   if End_Of_String and Length(Entry_Name)> 0 then
      Pathname_Type: = 3
   else
      Pathname_Type: = 4;
   SubString(Pathname,Start,Final-1,Field_Path);
```

```
Substitution(Field_Path,Field_Name);
end;
```

Pathnames, in the preferred embodiment, are implemented as strings of data. To decompose a string into its parts, the interpreter uses functions sometimes called subroutines such as Substring and Skip_To_Character. The Substring function extracts a substring (a portion of a string) from a full string. For example, "Al" can be extracted from "Alan" by a command such as "Substring (Complete String, 1, 2, Final$_{13}$ Substring)". The Substring function discussed above, as do most substring functions, uses numbers that allow access to each character in a string by its numeric position. In the above example, "A" is in the first position in "Alan". The Skip$_{13}$ To_Character is another string function that uses a numeric index, as in the Substring function, to advance within the string to find the position of a certain character. Subroutines which perform these functions are available in many machine dependent implementations of Pascal such as DEC-Pascal which is the language implementation preferred for the present invention. One of ordinary skill in the art could make the necessary adaptations of the supplied subroutines depending upon the machine dependent implementation of Pascal chosen to provide the string processing routines.

The above functions require indices, so that the interpreter can keep track of where the string starts and where it terminates. The "Start" index in the pseudocode is used to keep track of the beginning of the string and the "Final" index is used to keep track of the end of the string. The final position is one position past the last character in the substring.

Pathnames are addresses of information in the system database where the information can be data, instructions or commands, another address for an instruction, data or another address, etc. Both direct and indirect addressing using a pathname are available in the present invention. A pathname can include from one to three elements: a table name, an entry name and/or a field name. Spaces or colons are used to separate the pathname elements as follows:

tablename—addresses a table
   tablename:entryname—addresses an entry in the table
   tablename::fieldname—addresses a field in the table
   tablename:entryname:fieldname—addresses an item in the table Pathnames may be simple or complex. Simple pathnames have their elements separated by colons or blank spaces. In complex pathnames, an element is itself a pathname. Within a complex pathname both colons and blank spaces are used as element separators where the outer pathname elements are separated by colons and the inner pathname elements are separated by spaces.

Direct addressing consists of supplying a function with the exact location of the object (data or function) where the location is known ahead of time. Within direct addressing, substitution can occur to resolve a complex pathname into a simple pathname. The Substitution routine in the pseudocode above, resolves complex pathname elements. Whenever a pathname is encountered, each element is examined to determine if spaces or colons separate the elements If no spaces occur, then the pathname is complex and the value at the end of the inner pathname is returned (fetched) and substituted for the inner pathname. That is, the inner pathname is an address at which a substitute value can be found and substituted for the inner pathname, the Substitution routine can be called again if the value substituted is also a pathname.

Indirect addressing consists of supplying a function with a reference to the location of an object (data or function) needed. Indirect addressing is used when the user wants to supply a pathname for an argument which is not a pathname. Indirect addressing provides the power of pathname substitution in all non-pathname situations. Indirect addressing uses an item type attribute designated A4, when set to table, to direct control to another table. The item type attribute is set to table whenever indirect addressing is to occur. The indirection process treats the value of an item of type table as the address of the target item. If the item found is also of table type, then the indirection process is repeated. If the item found is not of type table, the value is returned as the result of the indirection. An example of indirection will be discussed with respect to the Parsing function discussed hereinafter.

Most system functions operate on all of the different pathname forms. To simplify the execution of the function, each pathname form is assigned a unique number.

For example, the Delete function, which will be discussed in more detail later, takes a single argument-a pathname, as in, delete, table or delete,table:entry or delete,table:entry:field or delete,table::field. Each of these pathnames forms a pathname number (1-4) respectvely so that the evaluation or implementation function, in this case Delete, can key off of the pathname type to call the correct function. For example, in a case type structure in Pascal the Delete function could take the following form:

```
case Pathname__Number of
1: Delete Table(Table__Name);
2: Delete Entry (Table__Name, Entry__Name);
3: Delete Item Value (Table__Name, Entry__Name,
   Field__Name);
4: Delete Field (Table__Name,Field__Name);
otherwise Build Error (Function__Entry);
end;
```

Where each subroutine for example "Delete Table" would perform the necessary list processing to remove the pointers to the table identified and the corresponding storage deallocation.

As is clear in the above discussion, the interpreter includes both direct and indirect addressing. A direct pathname can be used whenever a function specifies a pathname for one of its arguments. If a function specifies some other type of argument instead of a pathname for example, (an integer) then the pathname logic can always be invoked by setting the argument data type attribute (A4) to "table". This same approach is used throughout the interpreter as will be seen in the discussion of the Parse and Generate functions hereinafter. Indirect addresses can also be strung together into address chains. If, for example, the substitution process discovers a targeet value is of type "table" then the pathname algorithm is recursively invoked until a non-table item is found.

D. Parsing

The state of the art in parsing is well developed and information concerning parsing techniques in addition to those discussed herein which could be applied to the present invention, can be found in *Principles of Compiler Design* by Aho and Ullman, Addison-Wesley, 1977 which is incorporated by reference herein.

The parsing stage of the present invention is unique because it performs lexical and syntactic processing at the same time while producing a parse table instead of a typical parse tree. The beginning of any message interpretation, as illustrated in FIG. 3, starts with the Parse function which breaks up an input string into its lexical catagories and places the results in a table called the parse table. Parsing involves two steps. The parser function first looks in a grammar or syntax table, using the pathname supplied as an argument to see what type of syntactic unit the first word should be by examining the items in the grammar table. Then the parser scans the input sentence for a string separator and considers what was scanned to that point to be a word (token). A token is differentiated from its neighbor by its separator where the default for a separator in the preferred embodiment are any number of blanks. The type or value of a separator, for example, ": ; #" etc, is one of the attributes associated with an item in the grammar table.

If the type is class, the parser then checks to see if the first word in the sentence being parsed is an entry name in a lexical table having a type, for example, noun, that matches the first syntactic unit in the synta table. If the word matches the syntactic type and the referenced item appears in the grammar table lexicon, it becomes an item in the parse table with its syntactic type as the entry name. If the type is table, then an access of the named table occurs at the referenced item and parsing continues. If the type is string, the parser searches for the separator and places the separated token in the parse table. If the type is fixed length, such as 8-bit binary, the parser separates out the fixed length data and stores it in the parse table. FIG. 7 illustrates the parse table creation process.

Once the parser is finished with a particular item, it moves to the next item in the grammar table and the next word in the message is parsed. If the word does not match the syntactic type and lexicon and if the grammar item is required, the parser returns an error message and parsing of the particular entry stops and continues if the entry is embedded within a complex grammar. For each match found between an input sentence and the grammar, the parse function generates a linear table list of syntactic catagories and lexical values called the parse table. Entries in the parse table contain the matched strings, where the grammar items become the entry names and the data matched to them become items in those entries.

For example, when the interpreter is parsing the sentence "move the robot to the furnace" using a grammar table 134, which lists the legal order in which words or phrases of the message can appear, such as illustrated by FIG. 8. The first item (SENTENCES:COMMAND/-T/O) in the table is examined, the "T" indicates that the item is a pathname requiring that the indirect addressing function previously discussed be invoked. The item also indicates that the Sentences table should be accessed at the Command entry to perform the needed substitution. This first entry in the table further indicates by "O" that this is an optional sentence structure. Whether or not the item is optional "O" or required "R" is one of the attributes of the items that can be defined. Thus, in order to determine whether the sentence is a command, the table 134 of FIG. 8 must be recursively accessed at the Command entry.

The Command entry indicates that the first word in a command is required to be a verb. Since this item in the table 134 is not a pathname (the type attribute for table "T" is not present), the parser goes to the verb table 136 of FIG. 9 which is the lexical table for defining verbs, and scans the verb table 136 to determine if the word being examined is a verb. Since the word "move" is included within the verb table, an entry is made in the parse table 143 of FIG. 13.

The parser then returns to the Command entry of table 134 and moves to the next item in that entry which is defined as an optional article. The "1" in this item is a value for an attribute called a name restrictor. The name restrictor is attached to the lexical category in the parse table (See FIG. 13) and is used to distinguish between different tokens within the same lexical category. The parser goes to the article lexical table 138 of FIG. 10 and determines that the second word in the sentence is indeed an article, thereafter an entry is made in the parse table 143 of FIG. 13. The parser then returns to the third field of the Command entry in table 134 and recognizes tha the third word in the sentence must be a noun. The parser goes to the noun lexical table 140 in FIG. 11 and determines that the third word is indeed a noun thereafter making an entry in the parse table 143 of FIG. 13.

Now the parser moves to examine the fourth field of the Command entry in FIG. 8 and this field indicates that for a prepositional phrase, the table Sentences must be accessed a the Prep.Phrase entry and that this is a required item. The parser then moves to the Prep.Phrase entry, the first item of which indicates that the word must be a prepostion and that the item is required. The parser then compares the fourth word in the sentence with prepostions in the preposition lexical table 142 of FIG. 12 and makes the corresponding entry in the parse table 143. After examining the first item in the Prep.Phrase entry, the second idtem is examined and found to be an article which is entered in the parse table 143. Now the last and sixth word in the sentence is examined based on the third field of the Prep.Phrase entry in the Sentences grammar table, found to be an appropriate noun and an entry is made in the parse table 143. After the last word of the sentence is examined, the parser termintes. The resulting parse table of FIG. 13 is merely a list of the words arranged in the order of their recognition with the recognition identifier (lexical category with name restrictor) attached to each word.

If the first word in the message had not been a verb, such as in the sentence "The robot is broken", the parser, since the first entry in the table 134 is optional, retraces the list back to the first item in the first entry and moves to the next item SENTENCES:DECLARE/T/O and performs the same operations discussed above. For example, the parser of the present invention using the grammar table 134 of FIG. 8 could parse the declarative sentence "The robot is broken" into the parse table of FIG. 14 using the tables of FIGS. 9-12 and the additional lexical table of FIG. 15 defining objects of verbs.

As can be seen from this example, the parse function is capable of parsing any message which has a definable grammar.

Pseudocode which can be implemented in Pascal to produce the parse function is set forth below.

```
Parse:=true;
```

-continued

```
Start:=1;
Make_Table(WS_Pointer ↑ .Output.Zero_Entries.One_
  Field);
Find_Table(Grammar_Name.Grammar_Table);
Grammar_Item:=Grammar_Table ↑ .First_Entry ↑ .First_Item;
while Grammar_Item < > nil do
begin
  Scan_For_Word Separator(Grammar_Item.StringInput.
    Start,Before_Match,After_Match);
  SubString(StringInput,Start,Before_Match.Token);
  if Member_Of(Token, Grammar_Item) then
  begin
    Add_Entry(WS_Pointer ↑ .Output,Entry_Pointer);
    Label:=Grammar_Item ↑ .Attributes.Label;
    Rename_Entry(Entry_Pointer,
      Grammar_Item ↑ .Item_Value,Label);
    Entry_Pointer ↑ .First_Item ↑ .Item_Value:=Token;
  end
  else
  begin
      if not Grammar_Item ↑ .Attributes ↑ .Status =
        Optional then
      begin
        Parse:=false;
        unloop;
      end;
  end;
  Start:=After_Match;
  Grammar_Item:=Grammar_Item ↑ .Next_Field_Item;
end;
```

In the above pseudocode, first the skeleton form of the parse output table is created with one field and zero entries using a Make_Table function, to be discussed in detail later, which scans down the table list in the workspace until the null pointer is encountered, creates a pointer and record for the first field and a null pointer for the entries. The Find_Table routine returns a pointer to the grammar table, which will be used in parsing, by scanning down the linked table list in the designated workspace and comparing table names in the records with the table name argument until the desired table is found. The while loop and assignment statement (Grammar_item:=) illustrate how the items across an entry can be scanned. This code structure is one of the basic structures in the interpreter and it is used in some form in almost every function provided by the interpreter.

During the while loop, each grammar item is associated with a separator which is an attribute of the item and the routine Scan_For_Word_Separator searches across the input looking for the separator. The Scan_For_Word_Separator routine scans the symbols or characters of the message until a match with the separator attribute is found and then returns the pointer to the separated string. This search begins at the value of the index maintained in the Start variable (which points to the first character in the string comprising the word in the message), and when the parser finds the separator by comparing the characters or symbols in the word with the separator, the parser sets the variable Before_Match to the string index immediately before the separator that is, the index points at the end of the word. The variable Start is set to After_Match for the next time around a loop, that is, the After_Match variable points to the first character in the next word. Any separator that is used in a natural language or in a parts program for manufacturing can be included in the Scan$_{13}$ For_Word_Separator routine.

Once the beginning and the end of the word have been found, the word, called a token, can be extracted from the message by the Substring routine previously discussed. Thus, the interpreter is doing both lexical analysis and parsing in one step.

The Member_Of routine checks to see if the token fits within the grammatical category by scanning the lexical table for a match with the token. A grammatical category can be one of the following: (a) a legal data type such as strings, decimal integer, an 8 bit binary and others as will be discussed in detail hereinafter; (b) it can be a name of a user defined table, so that the user can define his own lexical category; and (c) it can also refer to another grammatical entry, including itself. In such a case, the parser is called recursively, therefore the parser of the present invention is, in the art, called a topdown parser. The Add_Entry routine adds a new entry to the parse table by finding the parse table previously created, creating an item record and linking the item record using the field pointer. The routine also adds or creates an entry record using the grammatical category and restrictor as the entry name, then links the entry record by adding a pointer to the item record and from the table record. The following lines (Label: = . . ., Rename_Entry . . . ) append the label that is unique to the entry (using the name restrictor and lexical category), and the Entry_Pointer assignment statement stores the token as the new value for the first item in that entry. Therefore, every time a word is identified, it is entered in the output parse table in the format of FIG. 16.

Each grammatical item in the grammar table, as previously discussed, is either required "R" or optional "O" and if the token is not a member of the grammatical item table (if not Grammar Item ↑ .), then it is an error if that item is a required item. Otherwise, parsing will continue with the next item. If an error does occur, then the parsing of this entry terminates (Parse: =false) and an appropriate error message can be generated. It is possible to recursively embed the parser so that a failure does not guarantee that a particular parse is a failure, but just indicates that a particular parsing path is a failure. Such backtracking in parsing is well known in the literature. Another technique is to provide a string as an item which will allow any word not previously recognized to be recognized as long as this item is the last item in the top entry and is made optional as illustrated in FIG. 8. A technique which will allow the parsing of a message that includes an indefinite member of message header tokens can also be provided. For example, if the table of FIG. 8 was modified so that the first row has an entry name of "BEGINNING" and the following items: "HEADER/O SENTENCES:BEGINNING/O SENTENCES:TOP/R", the recursive call of the parser would occur because each time a header token is recognized, the next item examined in the grammar table references the BEGINNING entry, thus putting the parser in a loop until a non-header token is encountered which will require the parser to move to the TOP entry and continue parsing.

E. Semantic Attachment

Referring to FIG. 3, once parsing is complete, semantic attachment with respect to a message is started by an Evaluate function calling an Expand function. At the end of the semantic attachment, the Expand function recursively calls the Evaluate function to cause the action or translation to occur. The Evaluate function that begins the semantic attachment phase is essentially a subroutine call which accesses the named table and performs the designated function. It is possible, in an alternative embodiment, to eliminate the first call to the Evaluate function and go directly to the Expand function after the message has been parsed. Since the second or recursive call is the most important, more detailed than the first call and more interesting, the first call of the Evaluate function will only be briefly discussed and the details concerning an Evaluate function will be provided after the Expand function is discussed.

To begin the semantic attachment phase, the Evaluate function is executed using the Start Up table 148 of FIG. 17. The Evaluate function, as will be discussed in more detail later, causes the Expand function to be executed (called) using the Parse table as the data table and the Rules table as the table to be expanded.

The Expand function implements the non-procedural rule based processing in the interpreter that provides the intelligence capability. One table (in this example the parse table, however, it could be any other table or tables designated by the user) supplies the data to be applied to a set of rules which can cause one or more rules to fire. When a rule fires, the function designated in the rule is executed. That is, the Expand function expects the name of a data table and the name of a semantics or rule table and will fire the rules with conditions that match the data.

Most prior art rule based systems are a collection of if statements, however, the rules in the present invention are in the form of calls to the Evaluate function to be discussed in detail later. The function table named in the rule is executed (evaluated) when there are entries in the data table that match each argument in the function call or rule. This approach is a known as pattern directed function call. Since each rule is tested, if no matches within the rule table exist, an optional "otherwise" function can be used as a mechanism for handling errors.

When the Expand function is executed using the Parse table 150 of FIG. 18, as the data table and the Rules table 152 of FIG. 19 as the semantics table, the following actions are performed. The Expand function scans the first rule R1 to determine whether to execute a call of the Evaluate function using the function or table called Furnace Update by determining whether the Parse Table includes a row labeled "verb" having a value equal to "set" and in addition, has rows called noun-1, noun-2 and decimal. If all the data items are available, that is, if all the data exists and satisfies the conditions associated with each argument, and in this case they do, the Evaluate function is executed (the rule fires) using the Furnace Update table. Prior to calling the Evaluate function, the values in the Parse Table are assigned to the appropriate types and a parameter table called a Substitution table 154, as illustrated in FIG. 20, is built. The parameter table or arguments list is used when executing the Furnace Update. When the interpreter returns from the function call, the next rule is examined to see if it should fire.

The example above illustrates a rules table which assumes that the name of the data table is fixed, and in the example, the data table is assumed to always be the Parse Table. It is also possible, as will be discussed in more detail later, to implement the Expand function as a statement or command in a language and have the data table as an argument in the statement or command. In the example illustrated in FIG. 20, the function called by the rule is the Evaluate function, however, it is further possible to call a different function such as a Generate function.

Pseudocode which can be used to implement the expand function in Pascal is set forth below.

```
Fired:=false; Matched:=false;
Find_Table(Data_Name,Data_Table);
Find_Table(Rule_Name,Rule_Table);
Rule_Entry:=Rule_Table ↑ .First_Entry;
while Rule_Entry <> nil do
begin
   Rule_Item:=Rule_Entry ↑ .First_Item ↑ .Next_Field_Item;
   Pair_Item:=Rule_Item ↑ .Next_Field_Item;
   while Get_Next_Pair(Pair_Item,Type_Item,Value_Item)
   do
   begin
      Get_Operator(Value_Item,Operator);
      case Operator of
      Operator1:
         begin
            if not Match_Data(Data_Table,Type_Item,
               Value_Item)
            then begin
               Matched:=false; unloop;
            end;
         end;
      ...
      OperatorN:
      ...
      otherwise
         Build_Error(Rule_Entry);
      end;
   end;
   if not Matched then unloop;
   Fired:=true; Special_Stack_Sub(Rule_Entry);
   Evaluate (Rule_Item ↑ _Value,nil); UnStack_Sub;
   Rule_Entry:-Rule_Entry ↑ Next_Entry;
end;
if Fired then Evaluate(Otherwise_Name,nil);
```

Referring to the pseudocode above, both the data and the rule tables must be found before the matching of rules can begin. These functions operate as previously discussed for other find functions which use a pathname to locate an object or resolve an address. The routine loops through the set of rules trying to find a match one rule at a time. The first bookkeeping task is to find the position of the first argument type and value pair. The function Get_Next_Pair returns a pointer to both the type and value part of an argument in the same manner as the previously discussed find functions. This function is only true if they both exist and is otherwise. The Get_Operator returns the type of operator for this pair, so that it can be used to drive the case statement that performs the correct matching action. Each operator has corresponding code within the case statement for performing the operation.

In the Rules table 152 of FIG. 19, for example, the operator for the value of the first argument in rule R1 is "equal". In this situation, the code that executes for the equal operation would compare the value "set" to the verb item in the Parse Table of FIG. 18 and return a true condition if a match occurs. If a match does not occur in any clause the value of the condition indicator (Match:=) is returned as false. If the conditional indicator is set to false during any of the operations in the rule, the rule does not fire, i.e., it aborts. Other operators can be provided as the user desires, for example, the most basic interpreter should include equal, not equal, greater than and less than. The Pascal code for the individual conditional operations (Match_Data) which performs simple string and numeric comparisons, can be provided by one of ordinary skill in Pascal. If the rule aborts, that is, if a match does not occur, the next rule will then be selected and Expand function will continue. If a legal operator is not found, then the Expand function builds an error for the user to appraise the user of the situation and continues. When a rule fires (Fired:=-true) the Evaluate function is recursively called with a new set of arguments (the conditions in the rule). A Substitution Table is built (FIG. 20), however, the operators are removed so as to not interfere with the actual values. Since a new Substitution Table is built, the old table must be pushed onto a stack by the Special_Stack_Sub, so that it can be restored after the table function is finished executing. Special_Stack_Sub operates like other stack routines which update a pointer to the top of the stack as items are added to or taken off the stack and the code therefor can be provided by one of ordinary skill in the art. The Expand function thus does extra work in building the Substitution Table because each operator can apply side effects to Substitution Table creation.

Finally, after a rule has been matched and the Substitution Table built, the function part of the rule is executed. Since the Evaluate function executed as the result of a rule firing is not in charge of building the Substitution Table, the Expand statement at the end of the rule testing must delete the Substitution Table and restore the previous table using the Unstack_Sub routine which performs the reverse of the stack routine discussed above. If, by chance, no rules are invoked when the Expand function is performed, then it is possible to specify an otherwise clause which will execute a special function designed by the user for this contingency.

The Expand function is one good way to attach meaning to a message, and even though only one table (Parse Table) is used as the data table in the above example, in an alternative embodiment it is possible to use multiple data tables merely by adding code which will search multiple data tables for matches. It is also possible to bind the values in the data table to the actual values in the rules table which results in the values being placed in the Substitution Table. These changes in the Pascal code are within the ordinary skill of a Pascal programmer.

F. Function Evaluation

Referring back to FIG. 3, once meaning is attached to a particular message at node $F_1$, the message is evaluated and some action is executed if necessary. The Evaluate function at this stage which causes the actuation or translation, is the recursive call of the Evaluate function previously mentioned. This second call of the Evaluate function accesses the table to be evaluated, creates a Substitution Table, as illustrated in FIG. 20 which holds the arguments for the subroutine call. The Evaluate function evaluates or executes whatever functions are defined in the table indicated in the rule which is fired. That is, the Evaluate function is a subroutine call which calls still further subroutines.

When rule R2 in FIG. 19 is fired, for example, a table 156 named Move, illustrated in FIG. 21 is evaluated using the items in the Substitution Table 154 of FIG. 20 as the function arguments. The Move table 156 is an example of a user created table of function calls. The Evaluate function accesses the Move table of FIG. 21 and calls the predefined interpreter functions one at a time using the values in the substitution table as the arguments for the predefined function calls. This particular Move function table is evaluated by executing the Update function twice and the Generate function once. The Update function essentially causes the data in one table to be used to modify the data in a second table and the Generate function essentially operates in the reverse to a parse function to produce a message. Both the Update and Generate functions will be discussed in more detail hereinafter.

Below is the pseudocode for the Evaluate function.

```
if Eval__Entry < > nil then Stack__Sub(Eval__Entry);
Find__Table(Function__Name,Function__Table);
Function__Entry: = Function__Table ↑ .First__Entry;
while Function__Entry < > nil do
begin
    case Function__Entry ↑ .First__Item ↑ .Item__Value of
    Predefined__Function1:
        begin
            Get__Function__Arguments(Function__Entry,
                Arg__List);
            Predefined__Function(Arg__List);
        end;
    ...
    ...
    Evaluate:
        begin
            Get__Functions__Arguments(Function__Entry,
                Arg__List);
            Evaluate(Function__Name,Function__Entry);
        end;
    Predefined__FunctionN:
        begin
            Get__Function__Arguments(Function__Entry,
                Arg__List);
            Predefined__FunctionN(Arg__List);
        end;
    otherwise
        begin
            Build__Error(Function__Entry);
        end;
    end;
    Function__Entry: = Function__Entry ↑ .Next__Entry;
end;
if Eval__Entry < > nil then UnStack__Sub;
```

Referring to the pseudocode above, the Evaluate function must first decide whether or not this function has all its arguments and whether it should build a Substitution Table as illustrated in FIG. 20. If the Evaluate function does build a Substitution Table, it must save any previous Substitution Table by pushing it onto a stack as previously discussed. After the argument list for a function is built, (FIG. 20), the interpreter finds the table that represents the function to be executed in a manner as previously discussed. A function is executed by executing each entry in the table in order. The first item of an entry in the table (FIG. 21) is the function name and the following items are the function arguments.

The Evaluate function is essentially a large case statement where there is one case for each of the predefined functions in the interpreter of the present invention. Each case selector is responsible for doing two things, first, getting the arguments out of the table and then calling the predefined implementation function for this function. These predefined functions, such as Update, Generate and Evaluate, along with other predefined functions are discussed in this application and, of course, other functions can be created by the user as desired and called by the case type structure. One of the predefined functions can be another Evaluate function as indicated in the pseudocode, that is, the Evaluate function can recursively call the Evaluate function.

If the function listed in the first item of an entry is not a legal interpreter function, then the interpreter builds an error list and does not abort the user's function, but rather writes out an accumulated list of errors after the function has terminated. The Unstack__Sub routine deletes the Substitution Table (the arguments list) and renames the last saved Substitution Table as the current Substitution Table at the end of the evaluation. In this way, the Evaluate function can call itself without destroying its parents argument list.

The Evaluate function can be called from the Connect function, to be discussed later, the Expand function previously discussed, and several of the workspace related functions also to be discussed later.

G. The Table Update Function

The predefined Update function essentially matches the entry field names between tables to decide which items in one table should be updated by which items from a second table. For example, when executing the second Update function in FIG. 21, the interpreter updates the Robot Language table 158 of FIG. 22 at the entry Move Robot with the positions for furnace found in the Positions table 160 of FIG. 23. That is, the interpreter accesses the Positions table at the entry called Furnace and retrieves the values 15 and 05 for the X and Y positions of the furnace respectively. The interpreter then inserts these values into the appropriate items in the Robot Language table 158 so that the Robot Language table is updated to look as in FIG. 24. The field in FIGS. 22 and 24 having the label Robot Command includes items (M05 and M03) which represent commands recognizable by a hypothetical robot which commands will move the robot or the gripper of the robot in a hypothetical robot language. The actual format for the robot commands would be dictated by the particular vendors machine.

Pseudocode which can be used as a guide for implementation of the Update function in Pascal is set forth below.

```
Get__PathName(Source__Path,Table__Source,Entry__Source,
    Field__Source,Type__Source);
Get__PathName(Target__Path,Table__Target,Entry__Target,
    Field__Target,Type__Target);
UpdateType: = ((Type__Source-1)*4) + Type__Target;
case UpdateType of
1:Update__Table__To__Table(Table__Source,Table__Target);
2:Update__Table__To__Entry(Table__Source,Table__Target,
    Entry__Target);
...
5:Update__Entry__To__Table(Table__Source,Entry__Source,
    Table__Target);
...
end;
```

Update Table To Table Sub-Operation

```
Entry__Target__Pointer: = Table__Target__Pointer ↑ .First__
    Entry;
while Entry__Target__Pointer < > nil do
begin
    Target__Item: = Entry__Target__Pointer ↑ .First__Item;
    Field__Target__Pointer: = Table__Target__
        Pointer ↑ .First__Field;
    while Field__Target__Pointer < > nil do
    begin
        Find__Item(Table__Source,Entry__Target__Pointer ↑ .
            Entry__Name,
            Field__Target__Pointer ↑ .Field__Name,Source
            __Item);
        Copy__Item__To__Item(Source__Item,Target__Item);
        Target__Item: = Target__Item ↑ .Next__Field__Item;
        Field__Target__Pointer: = Field__Target__
            Pointer ↑ .Next__Field;
    end;
    Entry__Target__Pointer: = Entry__Target__Pointer ↑ .
        Next__Entry;
```

```
-continued
end;
```

The Update function has many different possible forms because its input is two different pathnames that can both be one of four legal types which are determined as discussed previously. After getting the pathnames from the arguments in the linked list table being evaluated using the find operations previously discussed, the first step is to find each of the pathname types separately so that they can be combined into one number. The pathname type can be found in the attribute associated with the item as discussed in with respect to the pseudocode on addressing. The number is produced by the assignment statement (Update Type:=). This number ranges from 1 to 16 and can be used to easily pick-out the right update function to perform the designated update combination in the case type structure. Some of the combinations do not actually perform an update but, in fact, perform a match.

The first function Table_To_Table is the most elaborate of the update functions defined in the case type construction and an example of the pseudocode for the Table_To_Table update is also set forth above and discussed in detail below. The second function in the case statement illustrates why not every one of the functions can be an update. This function indicates that it is going to update a single entry from a whole table. Since this does not make sense, the inverse operation is carried out by this function and it returns the entry in the source table that matches the entry in the target table. The opposite of the second function is the fifth function in the case statement. The fifth function starts with a single entry and updates each entry in the target table with the single entry. The process of updating entry items means that fields must match between the two tables. In other words, this is a special case of the table to table operation.

The pseudocode above defining the update Table_To_Table suboperation is a detailed version of one of functions called by the case construction and the other functions merely amount to minor variations on this function. The process of updating one table from another table has several intricacies. For example, it is possible that the target and source tables have non-unique entry and field names. In an update, it is more important to fill each item in the target with new data than it is to find a position for each piece of information in the source. For this reason, the nested loops are driven by the target pointers rather than by the source pointers. As the pointers in the target are passed over, a new path can be constructed in the source table. The pathname is made up of the source table name, and the entry and field names from the target table. The item at the end of this path is found (if it exists). Once both items of the source and target are known then the actual item values and attributes can be updated (Copy_Item_To_Item) by using the pointer to the source to retrieve the value and attributes from the record, as defined in FIGS. 4 and 5, and storing the value and attributes in the record designated by the target pointer. For example, if the employees Bill and Jane exist in both FIGS. 25 and 26, and the Master Table 166 is the target and the Employees Table 164 is the source, then the table to table operation will fill in the items labeled with stars. In this operation the non-matching items (by address) are simply ignored.

H. The Message Generate Function

The Generate function is a general output function that roughly parallels the reverse of the Parse function previously discussed. The goal of the Generate function is to intelligently piece together the data items into one string that can then be connected to a remote destination (terminal, file, table or process), that is, added to the mail for the destination, such as a driver routine for a particular piece of equipment (a protocol handler for robot). The Generate function sends a message to a subprocess and expects a pathname from which to generate and destination to which to generate. If generating to a process, file, or table, the Generate function needs the ame of the process, file or table and the process message type.

If the Generate function is executed as defined in the table 156 of FIG. 21, for example, the Robot Language table of FIG. 22 is accessed at the Move Robot entry and the message "M03180565" is sent to a process called robot that is, the message is added to the mailbox of a robot protocol handler. In another example, if a Generate function as illustrated in FIG. 27 is executed, the Move Billet table 170 of FIG. 28 would be accessed and the strings represented by all the entries in the move billet table would concatenated into the following string:#M05102030#M01#M05103050#M03150535# M05051525#M02#M03102025#. This example illustrates how syntactic separators for statements within a language can be included in the message sent to the process without using the separator attributes. If any separators are required between the units within the string, such as between items "M03" and "15" the separator attribute which contains the item separator can be inserted between each item. FIG. 28 is a table that includes hypothetical commands necessary to move a hypothetical robot to a furnace while picking up and carrying an object. The Update function previously discussed above could be used to make the program of FIG. 28 into a general purpose robot move program by allowing the items in the program designating postions to be updatable variables.

Pseudocode which can be implemented in Pascal to perform the Generate function is set forth below:

```
Find_Entry(Entry_Name,Entry_Pointer);
Next_Item:=Entry_Pointer ↑ .First_Item;
while Next_Item < > nil do
begin
    if Next_Item ↑ .Attributes.Type=Table then
        Generate_Entry(Next_Item ↑ .Item_Value,
            Output_String)
    else
        String_Append(Output_String,Next_Item ↑ .Item_
            Value);
    Next_Item:=Next_Item ↑ .Next_Field_Item;
end;
Put_Message(Destination,Output_String);
```

The above pseudocode is an example of the most commonly used routine which generates messages from a single entry since this is analogous to the generation of a single sentence. Other routines can be provided for items, fields and entries by making minor modifications in the above pseudocode. The first step is to find the entry to be generated (assuming that the correct table has already been found/selected). For an entry, the contents of each item in that entry are examined in turn. The next step is to decide whether the current item is an actual value or a reference to another table part by examining the type attribute. If the type of this item is table, then the Generate routine is recursively called. In other words, an entry can be generated within another entry. If the item type is not equal to table then it is a legitimate value and it can be simply appended to the output string (String_Append) using any well known string concatenation operation. All of the output is accumulated into a single output string by the Generate function. For non-string compatible items, some data conversion may be required, however, this conversion can be performed by the various predefined functions of the interpreter discussed herein. Finally, after the output string has been built, it can be directed to the output destination designated in the third argument of, for example, table 168 which causes the output string to be passed to the robot process mailbox for the robot protocol handler.

The Generate function can support several unusual options that parallel the behavior of the parser. For example, it is possible to set an item attribute so that a particular item repeats by an integral number. It is also possible to set another item attribute that will cause the contents of that item to be reversed so that it comes out backwards in the string. This is important when the messages sent to particular machines or processes have their byte orders reversed from the table representation provided in the interpreter. These minor modifications can be added to the code by one of ordinary skill in Pascal.

I. The Process oonnect Function

As discussed above, the Parse, Expand, Evaluate, Update and Generate functions and addressing function allow a complete communication between two different subprocesses or device protocol handlers using messages suitable for each of the communicating machines. To make the job of communicating with various processes by the user even easier, the interpreter includes a Connect function. The Connect function can provide the glue which holds all the previously discussed functions together to form continuously executing interpreter.

The Connect function allows the interpreter to receive a message from a subprocess, that is, the connect function allows the subprocess to talk to the interpreter. The Connect function opens a connection between the interpreter and a subprocess and places the interpreter in a parse/evaluate loop that continues until the connection is broken. The Connect function essentially operates as an interpreter manager by moving to the workspace appropriate for each message received.

After the Connect function obtains a message from a table, file, process or terminal it moves to the message processing workspace after retrieving the information necessary to guide the parsing and interpretation from a system workspace. When in the proper workspace, the message is parsed using the grammar table designated in the workspace. Thereafter, the interpreter evaluates a table or tables designated in the workspace and repeats until the connection is terminated. The tables that are to be used for parsing and evaluation are set using the Parse_With and Parse_Eval attributes of the operating workspace. During a connection, an input is parsed according to the grammar table specified in the Parse_With workspace attribute and the results of the parse are placed in a table designated by the Parse_Output workspace attribute. The Connect function then evaluates the table specified in the Parse Eval workspace attribute, that is, the previously discussed Evaluate function is called. As will be recognized from the previous discussions, the Evaluate function can then execute, among other functions, an Expand function to make a decision based on the message, an Update function to update a database, a Generate function to generate a message or another Evaluate function to perform other desired actions. The Connect function expects the device type or message source (either the word table, terminal, file, or process), and a device name, that is, the table name, file name or process name.

Pseudocode for the Connect function which can be implemented in Pascal is set forth below:

```
while not End_Of_Input(Source) do
begin
    if Source=Terminal then write(WS_Pointer ↑ .
        Attributes.Prompt);
    Get_Message(Source,Device,StringInput);
    Old_Workspace: = Workspace_Pointer;
    Move_To_Workspace(System_Workspace);
    Find_Item(Language,Device,Parser,Item_Parser);
    Find_Item(Language,Device,Evaluator,Item_
        Evaluator);
    Find_Item(Language,Device,Workspace,Item_
        Workspace);
    Move_To_Workspace(Item_Workspace ↑ .Item_Value);
    Parse (StringInput,Item_Parser ↑ .Item_Value);
    Evaluate (Item_Evaluator ↑ .Item_Value,nil);
    Move_To_Workspace(Old_Workspace ↑ .Workspace_
        Name;
end;
```

In the pseudocode above, the End_Of_Input is true under different circumstances, when different sources of information are used, for example, for a file an end of file terminator will be encountered, for a terminal a special end of message such as a carriage return will reside at the end of the input message, for a table a null pointer at the end of the table would be reched and for a process, no message would be received from the process for a given period of time.

The message or mail is read from a FIFO priority ordered queue and tagged with the name of the process that sent the message. That is, the Get_Message routine finds the source message list using the find pathname techniques previously discussed. The Get_Message routine can also read put from a file or a terminal, if the source is provided. When a message is received, it is necessary first to figure out how the message should be processed. The system workspace or system dispatcher workspace has all the system information for the interpreter and in that information there is a special table 172 called Language that tells the interpreter which workspace, which parser grammar table and which function table should be evaluated to process the message as illustrated by FIG. 29. The Move_To_Workspace also sets a global variable Workspace Pointer to correctly point at the newly activated workspace. Pointers to the necessary information are then found by looking them up in the Language table. The Connect function then moves to the workspace that specializes in this type of message. The parser grammar table that is designed for this message is used to make an output table by the parse function previously described. Finally, a table is executed or evaluated that usually processes the input that has been analyzed by the parser using the Evaluate function previously described. The table evaluated can include any combination of the functions described herein. After the message has been processed, the interpreter returns to the original workspace. The messages are continuously read and processed by moving to the appropriate workspace until they are exhausted, at which point, the call to the evaluator has no arguments (hence the Nil argument).

Using the functions discussed previously, it is possible to create an interpreter which will parse a message, analyze the meaning of the message and perform some action appropriate to the meaning; however, some additional functions as discussed below are helpful in creating the interpreter and making it easier to use.

J. The Make Table Function

As can be seen from the previous discussion, all data and executable functions within the interpreter are defined in tables, thus, one of the most basic functions of the interpreter is the building of tables. The Make Table function is used to construct tables. This function must be told how many entries and fields to build, the table name and optional templates that specify default values (attributes, etc.) for each object built (tables, entries, fields, and items). This function then takes the argements and builds the skeleton of a table in a form as illustrated in FIGS. 4-6.

The pseudocode suitable for implementation of the Make__Table function in Pascal is set forth below.

```
new(Table__Pointer);
Name__Table(Table__Pointer,Template__Table);
for Loop__Field:=1 to Number__Of__Fields do
begin
    new(Next__Field);
    if Last__Field=nil then
        Table__Pointer ↑ .First__Field:=Next__Field
    else
        LastField ↑ .Next__Field:=Next__Field;
    Name__Field(Next__Field,Template__Field);
    LastField:=Next__Field;
end;
for Loop__Entry:=1 to Number__Of__Entries do
begin
    new(Next__Entry);
    if Last__Entry = nil then
        Table__Pointer ↑ .First__Entry:=Next__Entry
    else
        Last__Entry ↑ .Next__Entry:=Next__Entry;
    for Loop__field:=1 to Number__Of__Fields do
    begin
        new(Next__Item);
        if Last__Item <> nil then
            Next__Next Entry ↑ .First__Item:=Next__Item
        else
            Last__Item ↑ .Next__Field__Item:=Next__Item;
        Name__Item(Next__Item,Template__Item);
        Last__Item:=Next__Item;
    end;
    Name__Entry(Next__Entry,Template__Entry);
    Last__Entry:=Next__Entry;
end;
Link__down__Fields(Table__Pointer);
```

With reference to the pseudocode set forth above, a user's program is represented by dynamic structures. The effect of this is that there are no predefined limits on table sizes or names or value sizes. There is, however, a practical limit that a name cannot be longer than 65,535 characters (the maximum number represented in a 16 bit integer) when using the preferred data representation. This limit far exceeds any practical need.

The New statement allocates memory for an object of the correct size which is indicated by the pointer type. The first loop allocates fields and the algorithm that links the table together must carefully distinguish between linking fields together and the first field of a table with the table header, as illustrated in FIG. 5. This distinction must also be made with other types (entries and items). In this case, if the Last__Field is nil (not allocated) then it is clear that this is the first field and must be linked directly to the table header otherwise (else) the field pointer for the present record must point to the next field record. As the data definition of FIG. 6 shows, each object type has a name (or value) as well as a set of attributes. In addition, Name__Field is a procedure for coming up with the name of the object which is embedded in (Name__Table,Name__Entry,-Name__Field,Name__Item) using the addressing function previously discussed for resolving an indirect address. If a template table name is included in the call (it is optional) then the naming convention is simple, just copy the templates name value to the new object along with any attributes that have been stored in the template. If a template has not been supplied, then default settings and values are used. For example, the default settings for field names, is simply an "F" followed by an increasing number, so the field names look like F1 F2 F3 . . . as illustrated in FIG. 4. After an object has been constructed, linked, and properly named, then the pointer to it is saved so that the next object can be internally linked to it.

Both the allocation of entries and items follows the same algorithm in the next two loops as the one used for fields previously discussed. However, since this is a two-dimensional table, there are nested loops so that the number of items allocated is exactly the number of entries times the number of fields. At the end of the routine, the entries have been linked to the table header, fields have been linked to the table header, and the items have been linked across the entries.

Since many routines in the present invention also need a convenient means of accessing items down a particular field, the items must also be linked in the field direction. A routine Link__Down__Fields puts these finishing touches on a table. This routine finds the first item in the first entry and stores a pointer to this item in the first field record. The routine then finds the first item in the second entry and stores a pointer to this item in the corresponding place in the previous item. This process continues until the end of the entries are reached. The process repeats using the second field and the second items in all the entries. A repetition occurs until a null field pointer is encountered. The interpreter of the present invention does not require that a table must always be linked down a field, so a special flag in the table attributes indicates the current status of these links. On the other hand, a table must be always be linked correctly across the entries.

K. The Cut and Paste Functions

Two other functions, Cut and Paste, are very useful in an interpreter which manipulates and uses tables. The Cut function divides one table into two tables along either entry or field boundaries and the Paste function combines two tables into one table along either entry or field boundaries.

One very effective way to use these functions is in recursive programming, where the Cut function is used to peel off a standard component of a table (entries or fields). Finally, when the table begins to exit, the Paste command can be used to accumulate the results. This approach to programming is essentially the two-dimensional analog of recursive programming in LISP where the functions split and combine one-dimensional lists of data.

The pseudocode for the Cut function along entry lines is set forth below and the pseudocode necessary for cutting along field lines can be created from the pseudocode below with minor changes therein which can be made by a person of ordinary skill in Pascal.

```
Find_Table(Table_Name,Table_Pointer);
Next_Entry:=Table_Pointer ↑ .First_Entry;
Matched:=false;
while Next_Entry <> nil do
begin
   if Match_Names(Next_Entry ↑ .Entry_Name,Name1)then
begin
      if Match_Names(Next_Entry ↑ .Next_Entry ↑ .Entry
         Name,Name2)
      then
      begin
         Matched:=true;
         unloop;
      end;
   end;
   Next_Entry:=Next_Entry ↑ .Next_Entry;
end;
if Matched then
begin
   Second_Entry:=Next_Entry ↑ .Next_Entry;
   Next_Entry ↑ .Next_Entry:=nil;
   Next_Item:=Next_Entry ↑ .First_Item;
   while Next_Item <> nil do Next_Item ↑ .Next_Field_
      Item:=nil;
   Make_Table(Table_Name2,0,fields,Table_Pointer ↑ .
      First_Field);
   Table_Pointer ↑ .First_Entry:=Second_Entry;
   Link_Down_Fields(Table_Pointer);
end;
```

The first step is to find the table to cut into parts using the find or addressing functions previously discussed, the Table_Pointer then points to the table to be cut. The Cut function matches each entry name in the table to the first pattern. As soon as an entry name is found, then the next entry is matched with the second pattern. When both of these patterns are matched in conjunction, then the loop is terminated and the processing advances to the next stage (if Matched then). Each of the names can also be a wild card (which will be discussed hereinafter), so that a search pattern can match any of the entry names.

At this point there are now two entry pointers established in the tables. The first entry pointer is to the last entry of what will be the first table and the second entry pointer points to the first entry of what will be the second table. The next step is to set the pointers along the entire bottom entry of the first table to the null pointer by accessing the items and storing a null pointer in the portion of the record pointing to the next item in the field direction. This completes the operation on the first table, unless it is necessary to rename the table itself, which can be accomplished by accessing the table name field and changing the table name.

Preparing the second table involves making a new table header record and new field header records, as illustrated in FIGS. 5 and 6. The Make Table function previously discussed can be used to accomplish this, by asking it to build zero entries with the same number of fields that are found in the original table. Only one pointer must then be linked to effectively complete the second table. The first entry of the second table must be linked to the table header of the second part.

The Paste function is conceptually very simple since it can be viewed as linking the bottom items of one table to the top items of the second table. However, there are quite a few bookkeeping activities that must be taken care of such as the deletion of table and field headers, and the allocation of items when the table dimensions do not exactly match between the two tables.

Pseudocode suitable for implementing the Paste function in Pascal is set forth below.

```
Find_Table(Table_Name1,Table_Pointer1);
Find_Table(Table_Name2,Table_Pointer2);
Dimension(Table_Pointer1,Fields1,Entries1);
Dimension(Table_Pointer2,Fields2,Entries2);
if Fields1 > Fields2 then
      Add_Fields(Table_Pointer2,Fields1-Fields2,
         Template)
else
      Add_Fields(Table_Pointer1,Fields2-Fields1,
         Template);
Last_Entry:=nil;
Next_Entry:=Table_Pointer1 ↑ .Entries;
while Next_Entry <> nil do
begin
   Last_Entry:=Next_Entry;
   Next_Entry:=Next_Entry ↑ .Next_Entry;
end;
Last_Entry ↑ .Next Entry:=Table_Pointer2 ↑ .First_Entry;
Link_Down_Fields(Table_Pointer1);
Table_Pointer2 ↑ .First_Entry:=nil;
Delete_Table(Table_Name2);
```

Referring to the pseudocode above, the first step is to find the two tables that are going to be pasted together in a manner as previously discussed. In the pseudocode above, the tables are going to be pasted together along the entry line and the pseudocode for pasting together along field lines is substantially the same and could be provided by a person with ordinary skill in Pascal. It is quite possible that each table has different dimensions, that is, either a different number of entries and/or a different number of fields. The Dimension function within the pseudocode above merely counts the number of entries and fields in each table by scanning the appropriate lists, incrementing a counter each time a record is found and stopping counting when a null pointer is found.

Since all of the tables in the interpreter must remain rectangular, it is necessary to find the table with the maximum number of fields. Once the table with the maximum number of fields has been found, it is then possible to calculate (Add_Fields) how many fields should be added to the other table. A template can then be used to supply the default value for the new fields and items and their respective attributes.

The block of pseudocode beginning with "Last Entry:=nil;" is quite common in the implementation of the interpreter, since this is how the last object in a list can be found by tracing down the linked list. In this case, Last_Entry points to the last entry in the first table, and once the loop terminates Last_Entry must then be linked to the first entry of the second table by storing an appropriate pointer to the first entry in the first table in the appropriate portion (See FIGS. 5 and 6) of the record for the last entry in the second table. At this point, the last entry of the first table and the first entry of the second table are now linked and finally, all of the items are relinked down the fields as discussed previously.

After the Paste operation has been completed, the second table header and fields are isolated from the result table by setting the pointer in the table and fields records to the null pointer. At this point, the Delete Table function discussed herein, can be executed to delete the table and field headers since all the items and entries are a part of the first table, and the result is a single table.

L. The Conditional Execution Functions

Another pair of functions which are useful in an interpreter such as the present invention are constructs similar to if statements and while statements in Pascal-like languages. A Begin_Condition function has a list of conditions (or path expressions) and if all of the conditions are true, then the remaining commands in the table are executed. If the conditions are false, the interpreter skips over the following functions until it finds an End command and continues executing after the End command.

For example, if the Furnace Door table 174 illustrated in FIG. 30 exists and the Begin Table 176 of FIG. 31 is being executed by an Evaluate function, the furnace door entry for the position, in FIG. 30, will be compared with the furnace door open value, in FIG. 31, and if the condition is not equal a message will be generated to the furnace process to open the door similar to the way the move robot message was generated to the robot as previously discussed. Once this message is sent to the furnace, the robot can be moved to the furnace as previously discussed with respect to FIGS. 21 and 22.

Pseudocode which can be implemented in Pascal to perform the Begin_Condition function is set forth below.

```
repeat
  Condition_False:=false;
  while Get_Clause(Function_Item,Test_Path) and not
  Condition_False do begin
    Strip_Into_Parts(Test_Path,Right_Path,Left_Path
      _Op);
    Get_PathName(Left_Path,Table_Name,Entry_Name,
      Field_Name,Left_Type);
    case Left_Type of
    1: Find_Table(Table_Name,Table_Left);
    2: Find_Entry(Table_Name,Table_Entry,Entry_Left);
    3: Find_Item(Table_Name,Entry_Name,Field Name,
      Item_Left);
    4: Find_Field(Table_Name,Field_Name,Field_Left);
    end;
    if Length(Test_Op) > 0 then
      Get_Default_Item_Pointer(Table_Left,Entry
        _Left,Field,Item_Left) else
      Comparison_False:= not Found(Table_Left,Entry
        _Left,Field_Left);
    if not Comparison_False then
    begin
      if Length(Right_Path)>0 then
      begin
        {Analyze just like left half of the expression
        using pseudocode similar to the above.}
      end;
      Comparison_False:=not Compare(Item_Left,
        Item_Right,Test_Op);
    end;         {end of right part analysis}
  end;           {end of clauses}
  if not Comparison_False then Evaluate_Till_End else
    Skip_Till_After_End;
    until Condition_False;  {end of repeat for While-
      Statement}
```

With reference to the above pseudocode, the only difference between the Begin_Condition function and a While function is the existence of a control statement that causes the logic to execute until the condition is true. Such a control loop could be added to the above pseudocode by one of ordinary skill in Pascal to create the While function. Both the Begin_Condition and While functions are in conjunctive form, that is, they both allow clauses that are ANDed together and include negation; however, disjunctive forms (ORs) are not allowed. A disjunctive must be represented by several Begin_Condition functions. A while loop will continue until either all of the clauses have been exhausted or one of the clauses is shown to be false.

The first step in analyzing a clause is to split it into several components: a pathname to the left of an operator, the operator, and a pathname to the right of the operator. All of these parts with the exception of the left part are optional. A legal left part of any path expression is a pathname. The case statement shows how the pathname type (the type attribute) determines what interpreter object is searched for in the database of tables. This is the only required part of the path expression and it is true if the database object is found. It is false otherwise, even if the clause is a complex expression with an operator and a right part. If there is an operator in the expression then the Get_Default_Item_Pointer routine returns an item pointer even if either the entry or the field names are left off. If there is not an operator then the truth value of this expression is determined by checking whether or not the interpreter object has been found. If the left part of the expression is valid that is, it exists, then the right part is analyzed, shown to exist, and then finally the items value (right side) is compared to the items value on the left side. The Comparison actually compares the values of the left and right parts and then sets the Boolean condition Comparison_False according to the rules defined by the legal operators. The actual Pascal code for the desired comparison operations can be added by a person of ordinary skill in Pascal.

After all of the clauses have been validated, execution starts on the next entry in the function and the evaluation function continues until the first End statement is encountered in that table. This nesting of execution takes care of the nesting that is common in control structures such as the nested while loops in the Expand function previously discussed. If any of the clauses fail to be validated, then control in the user's function is advanced to one statement beyond the End statement associated with either the Begin Condition function or the While function. An entire clause can also be negated which makes the format of the expression logically complete. In addition, it is possible to compare a path-value with a constant value.

M. The Run Function

Another function that is useful in an interpreter is a function which allows user functions to be executed across workspace boundaries. These run extensions do not interfere with the user's current workspace environment unless that is the explicit function of the user created function. The Run function will build a Substitution Table, as discussed previously, (in which the formal parameter names will be the entries and the actual parameters will be the corresponding items) in the workspace in which the function is being executed. The Run function looks in the system workspace for a table designated by the Run function and executes that table.

One of the advantages of the Run function is that it always returns to the same workspace from which it starts. Normally, the interpreter has no way of remembering the name of the workspace in which it started. Programs or tables called to be executed by a Run can contain any of the previous functions discussed such as Evaluate and allows the user to refer to the Home workspace (that is, the workspace from which the run was started).

Pseudocode suitable for implementing the run function is set forth below.

```
OldSpace: = Workspace_Pointer;
Move_To_Workspace(System Workspace);
Evaluate(Run_Function,Arg_List);
Move_To_Workspace(OldSpace ↑ .Work-
   space_Name);
```

Referring to the pseudocode above, when a Run function is executed it involves moving to the System Workspace or system dispatcher workspace and usually building a new workspace, loading tables and executing a start-up table. Next, the function moves the interpreter to the workspace so that the installed user table/function can be executed. This user created function usually does not do the primary work, but rather just transfers data in the most appropriate way. The Run function is evaluated (executed), as previously discussed with respect to the Evaluate function, with an optional argument list. Finally, control is passed back to the old workspace so that the image to the user is that the interpreter has never left the original workspace environment.

N. Attributes

As discussed previously, each record in the system includes attributes. The item attributes for convenience are labelled A1–A10. The first item attribute A1, is the value attribute which stores the value in the item. The A2 attribute is a name restrictor attribute which is used in parsing. Whenever the parser matches an item in a grammar table, it makes an entry in the parse output table for that item and adds the name restrictor onto the end of the entry name, as illustrated in FIG. 13. The name restrictor is added so that the interpreter can tell by which grammar item the entry in the output table was made and the name restrictor makes each entry unique.

The A3 attribute is used in parsing and is otherwise known as a separator which signals the end of the token. A special kind of separator called a fence is used to call a sub-grammar for the portion of the sentence terminated by the fence whenever different parts of a sentence are separated by different separators.

The A4 attribute, which is used in parsing, indicates the internal type for the item value such as, table, decimal or alphanumeric. Whenever a table type attribute is encountered during parsing the parser knows that the item is an indirect reference to another item and performs the necessary addressing function to resolve the indirect address. This attribute is used to build complex grammars. The A5 attribute indicates the external type or format for the value when the value is to be printed or parsed.

The A6 attribute is called the required status attribute and is used by the parser to tell whether this item is empty, required, optional or an Exclusive OR part of the grammar. An example of the use of this attribute was discussed with respect to FIG. 8 previously. If the value is required, it means that the parser must find some input to match this item. If the attribute is optional, and if the parser cannot find an input to match this item, it ignores the item and goes on to the next item in the entry direction. If the attribute is Exclusive OR, the grammar entry can be satisfied with an item for which Exclusive OR is satisfied. If the item is empty, it indicates that the parser should ignore this item completely and not even consider it to be part of the grammar.

The A7 attribute is the reverse attribute used in parsing. If the reverse attribute is true, the parser will reverse all the bytes in the token that have been matched to this item where the first byte will come out last and the last byte will come out first. This feature is used only in communications with certain types of computers that expect the byte order to be swapped.

The A8 attribute is called the state saved attribute and is used by the parser to determine whether to save the current location when moving to the next entry. Saving the location is similar to moving to the next entry via a function call, while not saving the location is similar to moving the next entry using a GoTo statement. During parsing, if the A8 attribute is true, the parser will return to the point in the table after the indirect reference, otherwise no return occurs.

The A9 attribute is called the repeater attribute and is also used in parsing. The A4 internal-type attribute must be table in order to use this attribute. If there is a pathname in A9, it must point to an item with a number in it. The parser looks up this number and repeats this grammar item for the number of times indicated. This attribute is used in cases in which within an input string you to expect repetitions of a given item. Attribute A10 is another separator, however, this separator appears before the string representing the token.

Each workspace within the interpreter includes it own workspace attributes that define the working environment for the interpreter. The first workspace attribute called the Parse_With controls which table the parser will use the next time it is activated with the Connect command. The second attribute is the Parse-Eval attribute which controls which table the parser will execute after parsing a sentence. The third attribute is called the Parse-Output attribute and it designates which table the parser uses as its parse output table. The tokens and their catagories are stored in the parse output table. The Prompt attribute controls a prompt message used in the Connect command. The Construct attribute is the name of a table which keeps a record of the expand calls. The sixth attribute is the digits attribute which is an integer which determines how many digits are used in arithmetic operations. The seventh attribute, Priority, is the name of an integer value that is attached to outgoing mail. When the mail is read in the receiving process, it is always read in the order of highest priority (a priority ordered FIFO list). The eighth attribute is called the Output-To attribute and it sets the default workspace destination of any constructed table. That is, this attribute includes the null pointer of the default workspace. The Receive-From attribute is the name of the workspace in which tables will be found by commands. The Move-Table attribute specifies the name of a table which will be executed when the interpreter moves into a particular workspace. The Error_Table attribute refers to a table that will be executed automatically whenever there is an error in another table's execution. The Timer attribute is an integer value that specifies how many tens of milliseconds the Connect process command should wait for mail.

The most important of the functions and structures found in the preferred embodiment of the interpreter have been discussed above. The above-discussed functions and data structure of the interpreter can be implemented in a computer in several different ways. The functions and the Pascal code which perform the functions can be concatenated into a single program which performs a particular dedicated function. For example, fixed code can be produced to translate human command type sentences into commands for a robot. Such dedicated code could include, for example, a concatenation of Parse function and a Evaluate function calling an Expand function which calls the Evaluate function again to execute a function such as Generate or could be a Connect function which calls the necessary functions. Another implementation could be as a programming language which recognizes commands or program statements such as Parse, Expand, Evaluate, Update, Generate, Connect, Make, Cut, Paste, Begin Condition, While and Run, and makes subroutine calls to the appropriate function code using the parameters of the commands or statements as arguments for the subroutine calls.

O. Workspace Management

The present invention provides an environment which can include many workspaces, as illustrated in FIG. 4, where the workspaces are a logical way of organizing data and programs by application. In each interpreter environment or system of interpreters, a system workspace is provided which includes information for routing messages to the appropriate application workspace and for managing the environment of interpreters.

As discussed in prior sections, when a message is received, the interpreter moves to the system workspace to obtain routing information indicating how to process the message and then moves to the appropriate workspace for processing the message.

Each message when it is received includes three separate parts: a source portion which indicates where the message originated, a priority indicator indicating the priority of the message and a content portion which is the substance of the message. The source portion is used by the interpreter to access a Language table, as illustrated in FIG. 32 (an expanded version of FIG. 29), that is located in the system workspace and which provides the information necessary for understanding the message. Each message can be either a device message such as from a robot or a system message from one of the interpreters; however, all messages from one source are interpreted using the same workspace. That is, interpretation is source driven. The Language table is accessed to retrieve a workspace pointer and two sets of table names used to process the message. Each set of table names includes a grammar table name, an output table name for the parser and an evaluation table name used to process the message. For example, if a message is received from a robot, the table of FIG. 34 is accessed, resulting in the ROBOTMSG grammar table being used to parse the message, the output of the parser being stored in the PARSE-2 table and the MOVEROBOT table being used to evaluate the meaning of the message. The use of these tables by the ROBOT-1 workspace has been explained previously and will not be repeated here.

To help facilitate workspace management and remove the need for a large number of system messages, tables can be shared between workspaces. How tables are shared is discussed in detail in hereinafter. The shared tables can be updated by the various interpreters and could be called system or global tables.

P. Language Enhancements

If the implementation of the present invention is as a language, the following additional functions should be included.

The language can include the standard math functions included in any other language and once the person of ordinary skill in Pascal understands the data structure of the present invention, this person of ordinary skill in the art could easily implement such functions. For example, if the math function "plus" is being implemented, the routine which performs this function would be required to trace down the linked list using the pathname to find the values for each of the arguments in the algebraic expression. The routine would accumulate the sum of the values when found and store the sum in a designated pathname object.

It is also useful to have commands that allow the user to change the parts of particular records. For example, it may be necessary to change one of the attributes of an item. To accomplish a Change Attribute function, all that is necessary is to scan down the linked list using the pathname until the object (workspace, table, entry, etc.) is found, move to the attributes portion of the record, find the desired attribute and make the change. A Rename command which changes the name of a table, entry or field to a new name is also useful. This function would be accomplished by scanning down the linked lists until the object is found and the name field of the object would be changed to the new name. Along the same lines it would be simple to implement a Replace function which would search through a table and replace the occurrence of a particular value with a new value. One of ordinary skill in Pascal could provide such capability based on the descriptions provided herein.

Another useful function or instruction in an interpreter is a Clock command which would write the time of day to a terminal or into a table. Once again, this function could be provided by one of ordinary skill in Pascal and can be used to implement time directed calls.

Another function which would be very useful in an interpreter having a table data structure such as the present invention is the Complement function. To form the complement of two tables, first take the complement of the entries and the complement of the fields. The resulting table contains only the entries and fields, and the result table items are those from the first input table that fall into both these entries and fields. FIGS. 33 and 34 illustrate a table to be complemented and FIG. 35 illustrates the result. One of ordinary skill in Pascal could provide the code for such a function.

A Copy command selects parts of a table and copies them into a new table. For example, if the Robot Status table 184 of FIG. 36 is accessed to copy only the temperature information on the hot robot, the table 186 of FIG. 37 will result. This table is created by using the source pathname to scan down the linked list records and access the table at the entry, field or item designated by the pathname and then create a new linked list table with table name, fields, entries and items as illustrated in FIG. 36. One of ordinary skill in Pascal could provide the code for this command based on the descriptions of the present invention previously provided. During the copying, it is possible to transpose items. This additional function of a Copy command could also be provided by one of ordinary skill in Pascal.

Another useful copy-like command would be directed toward a Duplicate function which would duplicate an entire table in another workspace. To accomplish this function, the Copy command previously discussed could be used and the pathnames for the source object and the destination object would be used. That is, the pathname for the source object would include a workspace name and a table name, the routine would trace down the linked list to find the table desired to be copied and store the entire table in a storage area. The routine would then trace down the linked list to the object in the second pathname or to the null pointer and substitute a pointer to the table in the storage area. One of ordinary skill in Pascal could provide the code for this function.

A variation on the Duplicate and Copy functions discussed above is possible where a table can be exported physically from one workspace to another workspace and allow the table to be renamed in the process. The Export command adds new pointers to the table in the new workspace and removes the pointers to the table in the old workspace. The opposite, an Import function could also be provided.

Another useful command in an interpreter language would be the Delete command which would delete objects within a workspace. Once again, one of ordinary skill in Pascal should be able to provide such a routine which would scan down the linked list data structure and remove the pointers for the object (table, entry, etc.) that is desired to be removed. In particular, this function would be accomplished by scanning down the linked list until the desired object is found and replacing the pointer in the immediately preceding item with the pointer in the found object. The storage thus released would have to be returned to the system.

In many database manipulation systems, wild cards can be used. A wild card is a symbol which indicates to the interpreter that any name in a pathname structure will match during a comparison. One of ordinary skill in Pascal could add a wild card access routine to the addressing routine of the interpreter of the present invention.

Another function useful when an Evaluate function is being executed is a Return function. This command would cause the Evaluate function for the current table to be terminated immediately. The End function which appeared in FIG. 31 could also be provided by one of ordinary skill in the art. For example, during the processing of a Begin_Condition or While command, the Evaluate function would scan down the entries and find the End item whenever the condition of the Begin Condition statement is not true. The Evaluate function would then continue processing with the next function in the table.

A Share command is also very useful in the interpreter of the present invention when two workspaces need the same table, because the Share command would save large amounts of database memory when two different workspaces use the same table. To create a shared table all that needs to be done is to create a table pointer in one workspace that points to a table in another workspace. That is, if table 1 in workspace 1 is to be shared by workspace 2, then the routine would scan down the table list in workspace 1 until the address for table 1 is found then the routine would scan down the table list in workspace 2 until a null pointer is encountered and create a new table pointer using the address of the table found in workspace 1. Other bookkeeping operations would be necessary such as copying table attributes etc., however, one of ordinary skill in the art could provide appropriate code for this function. In addition, a shared table must be marked as such because it cannot be deleted by the Delete command. As a result, the Delete command would have to be modified to check to see if a table is shared before it is deleted. If, by accident, a shared table is deleted, then a bad pointer would exist in at least one of the workspaces. The modifications to the Evaluate function and Delete function necessary for implementation could be provided by one of ordinary skill in the art.

Variations on the Expand function discussed previously are also possible. As discussed previously, the Expand function looks for matches between data and rules. The Expand function previously discussed only fires the rule (that is, generally calls the Evaluate function) when there is a match between the data and the rules, it is possible to perform a cross product expansion of the data in the rules thereby handling non-unique table entries. One of ordinary skill in Pascal could provide the code necessary to provide this extra feature.

Another useful command in an interpreter is a command which takes the cross product of two tables with respect to the entry names. This command could be called a Filter command and it multiplies the entry with the same name in two tables. If there are two entries in a table, one called X and three in the second table, then there will be six entries in the result table. This is a standard cross product function and in the simplest case the Filter command can be used to let through only entries of the types chosen and screen out everything else which is not needed. For example, if the Source table 188 of FIG. 38 is filtered with the Filter table 190 of FIG. 39, the Result table 192 of FIG. 40 would result. One of ordinary skill in Pascal could provide the code for such a command using the data structure discussed herein.

It is also possible to form the Intersection of two tables by taking the intersection of their entry names and the intersection of their field names. The result table is formed from the entries and fields and its items are the items in the first table that fall in both the specified entries and fields. An example of the intersection of the tables of FIGS. 32 and 33 is illustrated in FIG. 41 as Table C. One of ordinary skill in Pascal could provide the code necessary to perform this function.

A further useful function would be the Union function which takes two tables and puts the result in a third table where the third table is a combination of the first two tables. The Union command is just a variation on the Paste function previously described.

Another useful command would be directed to an Invert function which would interchange a column of values with the input names or interchange a row of values with the field names depending on the pathname that is supplied. One of ordinary skill in Pascal could also provide this command. A Rotate command can be provided which would reverse the order of either articles or fields in a table. Once again, simple pointer modifications would accomplish this function. An additional feature appropriate in a table driven interpreter is a Shift command which would allow items in a field for entry to be shifted or rotated. For example, the third item in an entry can be rotated to the first item in the entry. Such shifts would be accomplished by merely rearranging the pointers in the table. One of ordinary skill in the art could provide the Pascal code for the above functions.

A useful variation on the pathname structure is to substitute a number for one of the arguments in the pathname. For example, when the pathname is Table_A:Row_A:3, the object addressed by the pathname would be the third item in an entry named Row A in a table named Table A. The code for this variation could be added to the addressing code previously discussed by one of ordinary skill in Pascal.

Another useful function associated with an interpreter is an Input command which would prompt the user by typing out a particular string, waiting for input from the terminal and then placing the input item in an object specified by a pathname. One of ordinary skill in Pascal could provide the code for this function.

A Reshape command would also be useful in an interpreter that uses tables. This command would change the dimensions of a table to some desired dimension. This function would be accomplished by simply rearranging the pointers in the table to obtain the desired shape. One of ordinary skill in the art could provide the code for this function.

A variation on the Generate command is an Unparse command which performs the inverse of a Parse, that is, it takes a table of already parsed tokens and a grammar table, and using the grammar table inserts all of the proper separators between the tokens and turns them back to a string of characters which it will send to a particular process such as a terminal. The Unparse command can be used to build an output based system rather than an input based system that uses the Parse command. If the Parse Table 194 of FIG. 42, for example, is used in conjunction with the grammar table G1 of FIG. 43, where a terminal is designated as the destination the sentence "The robot dropped the billet" will be printed out on the terminal. In particular, the interpreter would examine the required first entry in the table G1 (FIG. 43) and be referred to the Subject entry in the same table by the table type entry. At the Subject entry, the interpreter would read across and determine that the subject includes an optional article with a name restrictor 1 the Parse Table 196 would be searched, resulting in a hit. "The" would be placed in an output string. The next item in the subject entry is a required noun with a name restrictor. The interpreter would scan the Parse Table 196 of FIG. 42 looking for a match and upon finding a match make an addition to the output string. Similar processing would continue with the field 2 in the Sentence entry in the table of FIG. 43. Suitable Pascal code could be provided by one of ordinary skill by making appropriate modifications to the Parse and Generate function codes.

A variation on the Unparse function could be the opposite of the Connect function which would take database objects (tables) and turn them into text by automatically taking function and grammar tables as inputs, and applying the function to the database tables to create a token table. The grammar table and token table would be used to unparse the token table turning it into a string of characters which can be sent to a destination. This function would keep looping until a token table is not produced. Once again, a person of ordinary skill in the art could provide this function.

If the invention is implemented as a language it is also possible to provide an assembler which would read a text file and convert the file into a table. A compiler could also be constructed to produce executable object code. It is also possible for one of ordinary skill in Pasal to provide the language with variations having input and output commands which open and close files, and print, read or write the files, etc.

Additional details concerning implementation of the present invention as a language can be found in the attached microfiche Appendix.

V. APPLICATION

A. Workcell Control

FIG. 44 illustrates an application of the interpreter of the present invention to a manufacturing workcell which uses a vision system 200 to locate a part, and a robot 202 to carry the part to and from a furnace 204. A message M1 from the furnace 204 indicating, for example, that the furnace 204 door is open, would enter the system at the interrupt level and be placed directly in the device mailbox 206. After the message is completely received, it is transferred by a protocol handler 208 to a protocol agenda 210. The protocol handler 208 then strips the protocol information off the message and decides whether or not the message is valid. If the message is not valid, the protocol handler 208 informs the furnace 204. If the message is valid, the protocol handler sends the message to the interpreter agenda mail box 212. The protocol handler 208 is an application program written by the user in a language such as Pascal which is capable of receiving a message, stripping the headers, trailers, etc., from the message and determining whether the message is a valid message. One of ordinary skill in the art who understands the messages that could be produced by the furnace 204 would be capable of producing the code necessary for the protocol handler 208.

The agenda mailboxes 210, 212, 222 and 230 and device mailboxes 206, 226 and 234 in FIG. 44 are FIFO priority ordered lists. Ordering or sorting of such lists is within the skill of the ordinarily skilled in Pascal.

After the message is deposited in the agenda mailbox 212, an application program in accordance with the present invention begins processing. Using a Connect function, the message in the agenda 212 is retrieved. The application then moves to the system dispatcher workspace 214 which includes a table as illustrated in FIG. 29 which indicates which workspace specializes in the received message, the name of the grammar table used for parsing and the name of the the function to be evaluated after parsing is complete. Once these items have been retrieved, the application program moves to the workspace for the particular specialist and the Connect function continues by executing the designated Parse and Evaluate function with the designated tables.

In the example of FIG. 44, the message that the furnace door is open would be parsed by the furnace machine specialist interpreter 216. The machine specialist 216, after the message is parsed, would Evaluate a function table which would perform the needed Expand and Evaluate functions to Update the necessary position tables and status tables relative to the furnace 204 and to send a message to the cell specialist interpreter 218 via the mailbox 184. Once the message to the cell specialist 218 is deposited in the mailbox 184, the application returns to the original workspace and continues the Connect function. The message for the cell specialist 218 would cause the application to move to the system dispatcher workspace 214 and then move to the cell specialist workspace 218. The cell specialist 218 would parse the message and update a Cell status or states table 236, such as illustrated in FIG. 45, to indicate that the furnace door is open. Next, the cell specialist 218 would perform an Expand function on a rules table 236 such as illustrated in FIG. 46. Since the Furnace value of the Furnace table is "door open" and the value of Robot is "loaded part", the result would be the evaluation of a function table called Action1. The function table called Action1 could send a message to the robot machine specialist interpreter 220 through the agenda mailbox 220. Once again the application program would move to the system dispatcher workspace 214 then to the robot specialist workspace 220. The robot machine specialist 194 would Parse the message, Expand the message, Evaluate a rule table which could be similar to the rule table of FIG. 19. The result might be the execution of a function table such as in FIG. 27 which would result in the generation of a message directed to the robot from the table of FIG. 28. The message from the robot machine specialist interpreter 220 would be entered into the agenda mailbox 222 of the robot protocol handler. The robot protocol handler 224 would retrieve the message in the mailbox 222, apply any necessary information such as trailers and headers and send the message to the robot 202.

If a message is generated by the vision system 200 or robot 202, it would be handled in the same manner as the furnace message.

A command useful when a workcell is being managed by a number of interpreters is the Schedule function which would schedule the arrival at certain times of messages between processes. This command would be implemented as a message list having a time of arrival associated with each message at which time the message would be linked to the list of the destination process.

The workcell illustrated in FIG. 44 includes the interpreters, etc., in a single computer sharing the memory divided into appropriate workspaces. In an alternate embodiment, it is possible for each workspace/interpreter to be included in a separate computer located spatially distant from each other. In such a situation, each computer would include a mailbox and each interpreter would execute a Connect function retrieving messages from the appropriate mailbox. Such a system would require protocol handlers for receiving the messages, stripping off all protocol information and depositing the messages in the mailboxes. A more elaborate version of such a system of interpreters in different computers which would manage an entire factory is illustrated in FIG. 47. Each of the interpreters 240, 246, 252 and 266 is accessed through respective mailboxes 242, 248, 254, 260 and 269 by work stations 244, 250, 256, 262 and 270 or machines 264 and 272. The interpreters 240, 246, 252 and 266 communicate to each other over some type of communication path or common bus.

B. A Virtual Database

A virtual database is a database which will allow one question to access and collate data from different databases that can be in different formats and processed by different languages. The present invention can be used to create a virtual database 274 which allows a user at a terminal 276 (See FIG. 48) to ask a question via a user interface 278. The user interface 278 breaks the question into a question for first and second database specialists 280 and 282 where each factory database 284 and 286 is accessed by the specialists 280 and 282 using a different language.

For example, if the user asked "What tools do I need to order between now and Oct. 15, 1985?" The user interface 278 would produce a question to the first database specialist 280 such as "What orders must be complete by Oct. 15, 1985?" and to the second database specialist 282 set theoretic questions such as "Tools|Quantity=0; Tools|Style-Y and Tools|Quantity=0; Tools|Style=X." which are used to access the databases 284 and 286, as illustrated in FIGS. 49 and 50, associated with the first specialist 278 and the second specialist 282. The answer provided by the user interface once the database specialists provide their answers would be, for example, "Drills will have to be ordered to satisfy the IBM order".

Once the user interface 278 has parsed the question into a parse table 288 such as FIG. 51, rules would be fired which create the questions for the specialist databases 278 and 280. The set of rules could be a model of the information stored in the databases or could be an iteration on all the possible queries to the databases.

If the iteration approach is used the rule which matches the data in the parse table would be fired and the function table evaluated would create the appropriate database queries to the factory databases 284 and 286. The iteration approach is very wasteful of memory space and the model approach would construct database queries.

The model would consist of the legal subquestions or simple atomic questions that can be asked of each database.

Once the answers to the subquestions are provided to the user interface 278 by the database specialists 280 and 282, the user interface 278 would create a master table and from the master table the answer to the user question would be built and sent to the user terminal 276.

C. International Interface to Software Tools

Once an application, such as the workcell controller or virtual database as previously discussed, has been created which understands a user language such as English, it is a relatively simple task to add the capability of understanding another language such as French or Chinese. Providing additional user interfaces which communicate in the user's language, allows application programs to be internationalized.

In each new user interface, new grammar and lexical tables would be created which are suited for the user's language. In addition, the rules table will also be new so that the meaning of the sentences in the new language can be understood in the context of the application. The remainder of the application tables which, for example, move the robot, will remain the same.

Thus, the present invention makes software tools that are constructed in one country internationally available without requiring the user to learn the language of the country which developed the tool.

D. Other Applications and Embodiments

Many other applications are possible with the present invention such as a unified airline reservation system which receives reservation messages from specific airlines in the format desired by the airline, updates a common airline reservation database and sends the reservation to other airlines in a format acceptable by the other airlines. The present invention would also be suitable for creating a or a multilingual database which would accept database commands in any desired language and format. The present invention could also be used to create dedicated or multi-domain expert systems which would receive queries or data in any form and make rule based decisions or create rule based queries based on the factual data at hand.

Within any application, it is possible for subsets of the interpreter code to be used to perform useful functions. For example, in a system where an operator needs a periodic update of system status, a Generate function alone could be used to create a system status message from a system status table and send the message to a terminal. Another useful operation would be to execute a user defined function whenever all the data needed for the function existed. This could be accomplished by an Expand function continuously monitoring input data until all the data is available and calling the Evaluate function to execute a user defined routine defined by a table.

As will be understood by those of ordinary skill in the art, the present system has a large processing overhead commonly associated with list processing systems. As a result, care must be exercised in applying the system to time critical real time type systems to ensure that all time constraints are met. As computers become faster and computers are designed with an architecture particularly suitable for list processing, the above discussed care in applying the present invention to a real time process will not be necessary.

The many features and advantages of the invention are apparent from the detailed specification and thus it is intended by the appended claims to cover all such features and advantages of the interpreter which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope of the invention.

What is claimed is:

1. An interpreter process, comprising steps performed by a computer of:
   (a) converting a message into a parse table using a grammar table;
   (b) comparing the parse table to data needed in a condition designating a function table name; and
   (c) evaluating the named function table designated in the condition when the comparison indicates all data for the condition exists in the parse table.

2. A process as recited in claim 1, wherein step (a) comprises:
   (a1) dividing the message into tokens;
   (a2) scanning a grammar table for reference to a lexical table for each token where the reference is to a lexical table for a paritcular grammar type;
   (a3) comapring each token to lexical table contents deisgnated by the reference; and
   (a4) making an entry in the parse table where the token is added as an item and the grammar type is added as an entry name when the token appears in the lexical table and making an entry in the parse table where the token is added as an item and a legal data type name is added as the entry when the token does not appear in the lexical table and the token is a legal data type.

3. A process as recited in claim 2, wherein the grammar table includes name restrictors and a name restrictor is added to the entry name in step (a4).

4. A process as recited in claim 1, wherein the table name is a pathname.

5. An interpreter process, comprising steps performed by a computer of:
   (a) converting an input message into a parse table using a grammar table;
   (b) comparing the parse table to data needed in a condition designating a function table name;
   (c) evaluating the named function table designated by the condition when the comparison indicates all data for the condition exists in the parse table; and
   (d) generating an output message from an output message table as a result of evaluating the function table.

6. An interpreter process, comprising steps performed by a computer of:
   (a) parsing an input message into a parse table using a grammar table and a lexical table;
   (b) expanding the parse table using a semantics table including rules each designating function tables;
   (c) evaluating the function tables for all rules that fire; and
   (d) calling user designated functions during the evaluation of each function table.

7. A process as recited in claim 6, further comprising (e) generating at least one output message during the evaluation of step (c).

8. An interpreter process, comprising a step performed by a computer of:
   (a) generating a message from a table using a pathname to access the table and sending the message to a destination.

9. A process as recited in claim 8, wherein the table resides in a linked list and step (a) comprises the steps of:
   (a1) accessing the table through the linked list using the pathname; and
   (a2) combining items in the table into a message by concatenating the items.

10. a process as recited in claim 9, wherein step (a1) comprises the steps of:
    (i) accessing a table item through the linked list using the pathname; and
    (ii) accessing another table when the table items is an indirect reference.

11. A process as recited in claim 9, wherein step (a2) includes providing separators between each of the concatenated items.

12. An interpreter proces, comprising steps performed by a computer of:
    (a) expanding a data table to determine if data needed by a rule is available, the rule including a pathname designating a function table;
    (b) evaluating the function table designated by the pathname in the rule when a comparison indicates all data for the rule exists in the data table.

13. A process as recited in claim 12, wherein the function table resides on a linked list and includes function calls, and step (b) comprises:
    (b1) accessing the function table using the pathname;
    (b2) building a substitution table to provide an arguments list; and
    (b3) executing the functions listed in the function table using the arguments in the substitution table.

14. An interpreter process, comprising a step performed by a computer of:
    (a) expanding a data table to call a function.

15. An interpreter process comprising steps performed by a computer of:
    (a) analyzing a first message in a user defined first language to determine a meaning of the first message; and
    (b) producing a second message in a user defined second language in dependence on the meaning of the first message.

16. An interpreter process as recited in claim 15, wherein the first and second messages form a pair resulting in one of a translation from a natural language to a natural language, a translation from a natural language to an artificial language, a translation from an artificial language to a natural language and a translation from an artificial language to an artificial language.

17. An interpreter process, comprising steps performed by a computer of:
   (a) retrieving a message designating a workspace for
   (b) moving to a system workspace to determine interpretation information necessary to interpret the message; and
   (c) moving to the workspace for interpreting the message and interpreting the message in dependence upon the interpretation information.

18. A process as recited in claim 17, wherein step (c) comprises the steps of:
   (c1) parsing the message; and
   (c2) evaluating the message.

19. A process as recited in claim 18, wherein the interpretation information designates a grammar table used to parse the message, an output table for parsing results and a table name of a table used to evaluate the message.

* * * * *